US012657634B1

(12) United States Patent
Creech et al.

(10) Patent No.: US 12,657,634 B1
(45) Date of Patent: Jun. 16, 2026

(54) QUICK-RELEASE OF FUNDS FOLLOWING DAMAGE TO SELF- MONITORING STRUCTURES

(71) Applicant: UIPCO, LLC, San Antonio, TX (US)

(72) Inventors: Charlotte Thomas Creech, San Antonio, TX (US); Michael Kyne, Saint Petersburg, FL (US); Madhusudhana Rao Abburi, San Antonio, TX (US); Shayla Leigh Callis, Simi Valley, CA (US); Steven Robert Seigler, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 59 days.

(21) Appl. No.: 18/417,213

(22) Filed: Jan. 19, 2024

Related U.S. Application Data

(60) Provisional application No. 63/480,742, filed on Jan. 20, 2023.

(51) Int. Cl.
G06Q 40/08 (2012.01)

(52) U.S. Cl.
CPC .................................... G06Q 40/08 (2013.01)

(58) Field of Classification Search
CPC ....................................................... G06Q 40/08
See application file for complete search history.

(56) References Cited

U.S. PATENT DOCUMENTS

| | | | |
|---|---|---|---|
| 7,966,200 B1 | 6/2011 | Hopkins | |
| 10,380,694 B1 * | 8/2019 | Grant ........................ | G08G 5/32 |
| 10,380,696 B1 * | 8/2019 | Haller, Jr. .............. | G06Q 40/08 |

| | | | |
|---|---|---|---|
| 10,679,292 B1 * | 6/2020 | Call ........................ | G06Q 40/08 |
| 2012/0310786 A1 | 12/2012 | Suzuki | |
| 2014/0271221 A1 | 9/2014 | Soucy et al. | |
| 2014/0278681 A1 | 9/2014 | Cox | |
| 2015/0052024 A1 | 2/2015 | Apsley | |
| 2015/0064299 A1 | 3/2015 | Koreis | |
| 2015/0073834 A1 * | 3/2015 | Gurenko ................ | G06Q 40/08 |
| | | | 705/4 |
| 2016/0086254 A1 | 3/2016 | Tapley | |
| 2018/0081334 A1 | 3/2018 | Bostick | |

(Continued)

FOREIGN PATENT DOCUMENTS

WO        2019051048 A1      3/2019

OTHER PUBLICATIONS

Non-Final Office Action mailed Apr. 24, 2025 for U.S. Appl. No. 18/417,203.

(Continued)

*Primary Examiner* — Edward Chang

(74) *Attorney, Agent, or Firm* — Plumsea Law Group, LLC

(57) ABSTRACT

A method and system for improving and automating the processing of claims and payout transactions to enable an immediate release of funds to residents without requiring the insured member to first submit a claim are disclosed. The system and method are configured to determine whether there is a high likelihood of damage to a structure based on embedded sensor data. In response to a detection of damage at the structure, a payout can be automatically generated. In some cases, a smart contract is executed such that funds are expeditiously released via a distributed ledger system to the insured member.

20 Claims, 10 Drawing Sheets

(56)  References Cited

U.S. PATENT DOCUMENTS

| | | |
|---|---|---|
| 2018/0094953 A1 | 4/2018 | Colson |
| 2018/0126670 A1 | 5/2018 | DehghanNiri et al. |
| 2020/0049648 A1 | 2/2020 | Kunc et al. |
| 2022/0230180 A1 | 7/2022 | Singh |
| 2022/0391987 A1* | 12/2022 | Allogia ................ G06Q 20/065 |
| 2022/0404795 A1 | 12/2022 | Rodriguez Bravo |
| 2023/0256514 A1 | 8/2023 | Lymperopoulos |

OTHER PUBLICATIONS

Office Action mailed Jul. 1, 2025 for U.S. Appl. No. 18/417,174.

Office Action mailed Jun. 17, 2025 for U.S. Appl. No. 18/417,189.

Macdonald, E., Salas, R., Espalin, D., Perez, M., Aguilera, E., Muse, D., & Wicker, R. B. (2014). 3D printing for the rapid prototyping of structural electronics. IEEE access, 2, 234-242. (Year: 2014).

Notice of Allowance mailed Aug. 5, 2025 for U.S. Appl. No. 18/417,203.

Non-Final Office Action mailed Jan. 21, 2026 for U.S. Appl. No. 18/417,174.

Kim, H., Cha, M., Kim, B. C., Lee, I., & Mun, D. (2019). Maintenance framework for repairing partially damaged parts using 3D printing. International Journal of Precision Engineering and Manufacturing, 20(8), 1451-1464. (Year: 2019).

Notice of Allowance mailed Oct. 17, 2025 for U.S. Appl. No. 18/417,189.

\* cited by examiner

300

400

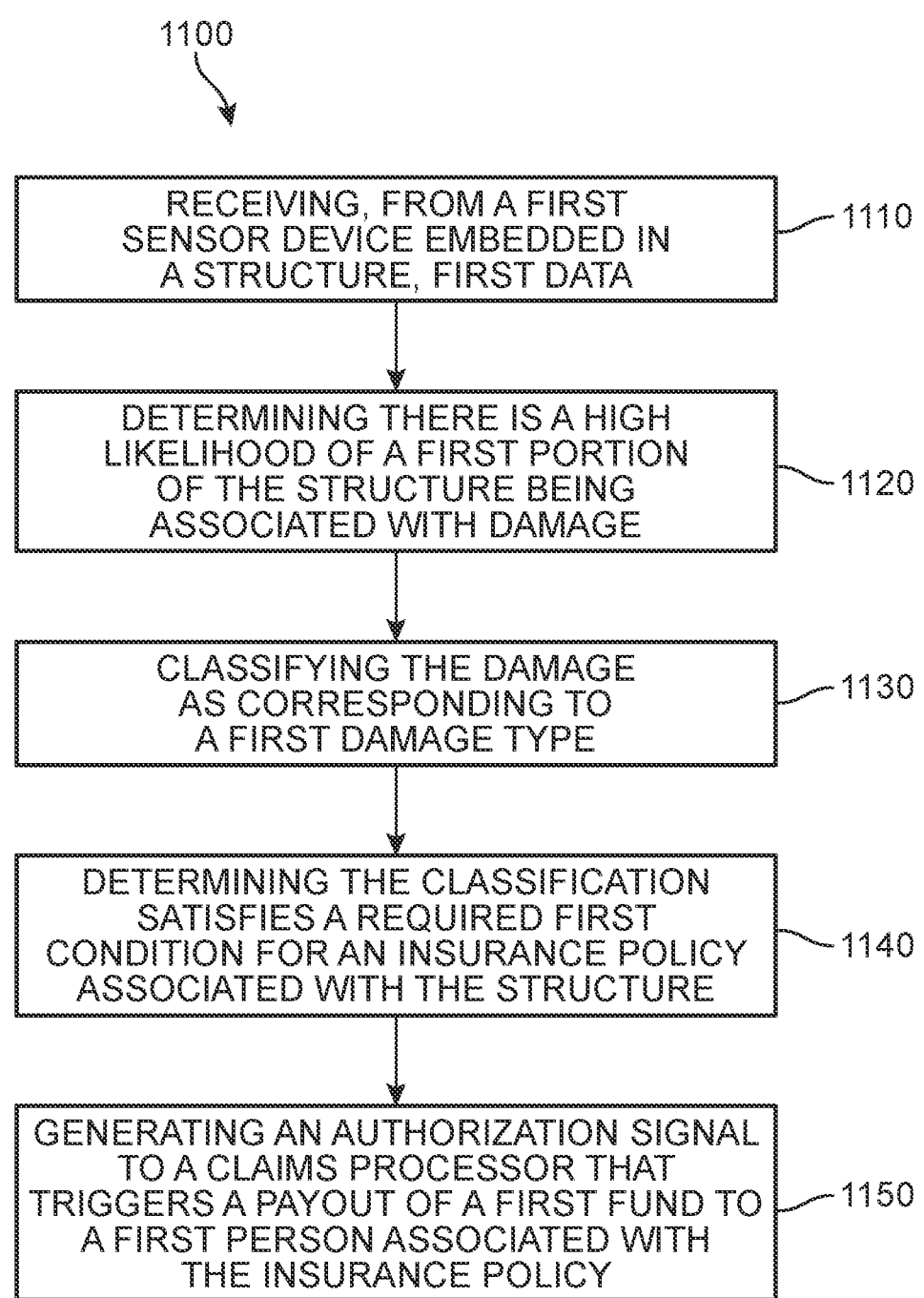

1100

RECEIVING, FROM A FIRST
SENSOR DEVICE EMBEDDED IN
A STRUCTURE, FIRST DATA                1110

DETERMINING THERE IS A HIGH
LIKELIHOOD OF A FIRST PORTION
OF THE STRUCTURE BEING
ASSOCIATED WITH DAMAGE                1120

CLASSIFYING THE DAMAGE
AS CORRESPONDING TO
A FIRST DAMAGE TYPE                1130

DETERMINING THE CLASSIFICATION
SATISFIES A REQUIRED FIRST
CONDITION FOR AN INSURANCE POLICY
ASSOCIATED WITH THE STRUCTURE          1140

GENERATING AN AUTHORIZATION SIGNAL
TO A CLAIMS PROCESSOR THAT
TRIGGERS A PAYOUT OF A FIRST FUND TO
A FIRST PERSON ASSOCIATED WITH
THE INSURANCE POLICY               1150

FIG. 11

QUICK-RELEASE OF FUNDS FOLLOWING DAMAGE TO SELF- MONITORING STRUCTURES

CROSS-REFERENCE TO RELATED APPLICATION

This application claims the benefit of U.S. Provisional Patent Application Ser. No. 63/480,742 filed on Jan. 20, 2023 and titled "Quick-Release of Funds Following Damage to Self-Monitoring Structures", the disclosure of which is incorporated by reference herein in its entirety.

TECHNICAL FIELD

The present disclosure generally relates to methods and systems for providing funds following damage to a self-monitoring structure, and specifically to managing claim transactions based on embedded sensor data for example in three-dimensional (3D) printed structures, to provide persons with the necessary funds to facilitate the repair process.

BACKGROUND

Following disasters such as floods, hurricanes, fires, and tornadoes, entities that insure properties in the disaster area typically need to communicate with insured members and conduct surveys to assess any damage that has impacted one or more insured properties. However, obtaining further information regarding the extent of such damage has remained a time-consuming and resource intensive task, typically requiring a human agent to visit the structure in person to more closely examine the effects of the disaster. Even when such examinations are necessary, local environmental conditions following a disaster can prevent access to the structure for several days or weeks. This process can lead to delays for homeowners and other insured entities in receiving much needed relief or support. The ability to quickly and accurately determine whether a home has been damaged in order to expedite payouts for insured residents is highly desirable. For example, in response to such events, having immediate access to funds can often directly and powerfully affect the lives of those impacted. However, residents of the associated disaster area are often forced to evacuate their homes. This makes delivering critical assistance to these residents difficult, since the funds may not be readily available through normal channels and delays in claim processing can be burdensome to homeowners.

There is a need in the art for a system and method that addresses the shortcomings discussed above.

SUMMARY

In one aspect, a method of releasing funds in response to property damage. The method includes a first step of receiving, at a claim management system and from a first sensor device embedded in a structure, first data, and a second step of determining, at the claim management system and based on the first data, there is a high likelihood of a first portion of the structure being associated with damage. In addition, a third step includes classifying, at the claim management system and based on the first data, the damage as corresponding to a first damage type, and a fourth step includes determining, at the claim management system, the classification satisfies a required first condition for an insurance policy associated with the structure. The method also includes a fifth step of generating, from the claim management system and in response to the first condition being satisfied, an authorization signal to a claims processor, the authorization signal triggering a payout of a first fund to a first person associated with the insurance policy.

In another aspect, a method of verifying damage to a property is also disclosed. The method includes a first step of receiving, at a claim management system and from a first sensor device embedded in a structure, first data, and a second step of determining, at the computing device and based on the first data, there is a likelihood of a first portion of the structure being associated with damage. The method also includes a third step of requesting, by the claim management system, second data associated with the first portion, the second data being captured by an onboard sensor of an aerial drone, and a fourth step of determining, at a verification module of the claim management system, that the second data is consistent with the first data. The method also includes a fifth step of generating, at the claim management system and in response to the second data being consistent with the first data, an authorization signal to a claims processor, the authorization signal triggering a payout of a first fund to a first person associated with the structure.

In another aspect, a system for releasing funds in response to property damage includes a processor and machine-readable media including instructions which, when executed by the processor, cause the processor to (1) receive, at a claim management system and from a first sensor device embedded in a structure, first data; (2) determine, at the claim management system and based on the first data, there is a high likelihood of a first portion of the structure being associated with damage; (3) classify, at the claim management system and based on the first data, the damage as corresponding to a first damage type; (4) determine, at the claim management system, the classification satisfies a required first condition for an insurance policy associated with the structure; and (5) generating, from the claim management system and in response to the first condition being satisfied, an authorization signal to a claims processor, the authorization signal triggering a payout of a first fund to a first person associated with the insurance policy.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 11 is a flow chart depicting a process of releasing funds in response to property damage, according to an embodiment.

DETAILED DESCRIPTION

Figure 1:
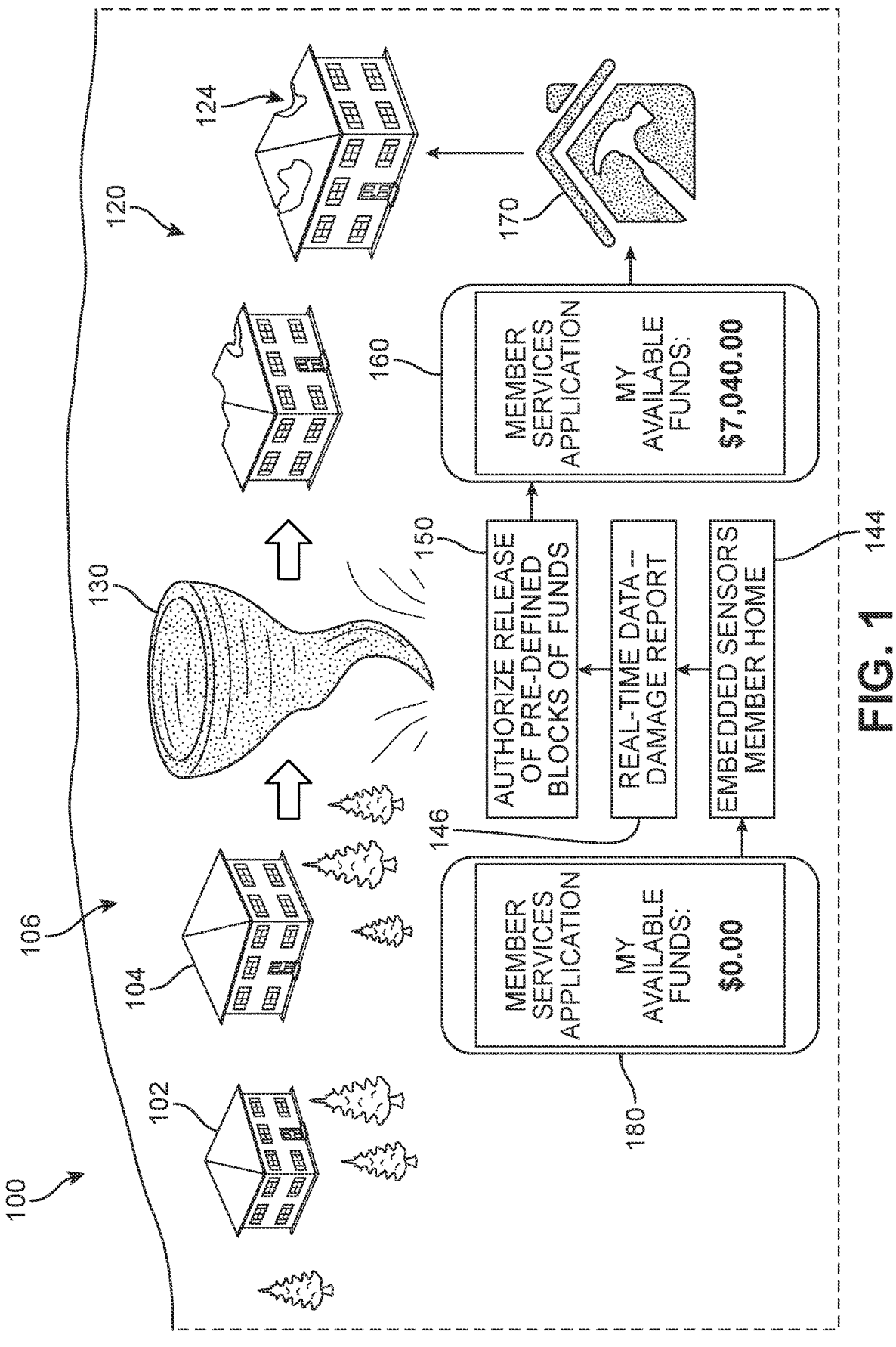
FIG. 1 depicts an overview of a scenario in which a disaster occurs and a claim management system triggers a release of funds based on embedded sensor data indicating damage at an insured structure, according to an embodiment.

The embodiments provide a system and method for improving claim process transactions by triggering an automated payout in response to sensor data from a damaged structure. In some embodiments, the sensor data can be used by the system to trigger such payouts without requiring the insured member to first submit a claim. Conventionally, insurance claims are submitted by insured members following some structural damage occurring during a natural disaster. These claims, submitted to the insurance carrier's intake mechanism, are processed, and then manually approved before any funds can be made available to the member. Using conventional methods, an insured resident of a building impacted by a disaster is at the mercy of the insurer's processing timeline. In some cases, disasters may prevent or hinder the member from access to communication channels (e.g., telephone and/or internet) through which to submit a claim, or the member may be otherwise unable to immediately submit a claim due to the damage caused to their property, further delaying their access to the funds.

In contrast, the embodiments provide methods and systems for automating and expediting claim process transactions for insured properties in which sensors have been incorporated, for example, in cases where three-dimensional printing (3DP) was used to construct the building and sensors were part of the structural print mixture. Thus, for purposes of this application, the term "embedded sensors" also refer to sensors that have been integrated into the structure as part of the original construction materials or mixtures. These embedded sensors can be used to collect data that is used to detect if there is damage happening (or has happened) at a member's home. In one example, such sensors are incorporated into the building's foundation and structure during the 3DP construction process. In different embodiments, data collected can indicate a floor has water damage, a wall has broken, a roof has begun to leak, a higher-than-normal humidity level is affected some part of the house, etc. In some embodiments, the proposed systems apply an artificial intelligence (AI) engine to determine approximate losses with the appropriate payouts based on the type of damage that has been detected and/or the degree of severity of the damage.

In different embodiments, a network of such sensors in a member's home could automatically detect leaks or seismic activity, and also identify the extent of such damage. In some cases, if such activity is detected by the onsite sensors, before claim payout, a drone or other robotic vehicle could be automatically dispatched to the member's home to verify the damage and whether it is significant enough to trigger an automated claim payout. In another example, the trigger would instead cause an automatic scheduling of the OEM (original equipment manufacturer or building manufacturer) to return to the site and perform repairs. The sensor data could further be used to settle claims and/or detect fraud.

As will be described herein, in some embodiments, payout could be based on a blockchain where the contract is then automatically triggered and the payment is automatically made to the member. In such cases, smart contracts can be used to preauthorize payments based on the sensor data collected and/or any follow-up data collected. In one embodiment, the funds will be automatically released in response to the detection of a predefined damage event (as determined by the system based on sensor data and the insured's policy).

In some other embodiments, the information for one member's home could be used to infer damage that may have been similarly caused to other homes in the same area during a natural disaster (network effect). In different embodiments, the system could also determine an overall amount to distribute or make available to the members in the disaster zone based on one or more of: (a) prior disasters, (b) density of members in the zone, (c) property values, and/or (d) prior claims settlement information. Some of these funds could be made immediately available. In different embodiments, these funds can be associated with blocks in a cryptocurrency or blockchain, and would effectively become pre-positioned block chain payments in a disaster zone. In another example, members would have mobile devices on which a specific emergency relief application ("app") is loaded. In some embodiments, the features offered by the proposed app can be integrated into an insurer's existing app.

As will be discussed in detail below, different embodiments may rely on different detected conditions to determine whether a property has incurred damage sufficient to initiate a follow-up assessment and/or automated payout. In one embodiment, the insured's home includes a plurality of embedded sensors that serve as real-time monitors. Data collected by the sensors can be shared with a network, which is connected to a claim management system (e.g., see FIG. 2). Thus, a damage detection module of the claim management system can 'listen' for specific types of data and/or patterns of data. This could occur, for example, following an earthquake in the region where the property is located, and strain or force sensors receive data that may be used by the damage detection module to determine that the structure had been impacted by the earthquake and the extent of the damage on a particular section of the structure. In some embodiments, these types of pre-defined sensed conditions can be used to fulfill terms of a smart contract that automatically trigger a release of or allow access to funds by the insured member.

As a general matter, the proposed systems can optionally incorporate the functionality of electronic interchange systems for managing transactions. In some embodiments, the interchange system employs blockchain elements that can be used in a payment apparatus for managing payments or other types of transactions, and for managing user accounts. The interchange system enables users to enroll in the system, and enables the various users' computing devices to be used as confirmation centers for new transactions and/or funds transfers between users. The system also provides a payment gateway and/or exchange base between digital currency users and other entities such as merchants, vendors, service-providers, and/or other parties that may use other types of currency (e.g., government-provided currency). In some implementations, the system includes a centralized server and/or cluster of servers that provide blockchain currency miners. User device(s) may also provide blockchain currency miners, in addition to or instead of the server device(s). The currency miners may enable the management of the ledger of transactions and/or transfers of digital currency coins between digital and physical payment apparatuses and/or other financial entities. Miners provide verification by submitting mathematical proofs and are rewarded with transaction fees and/or newly generated crypto-currency (e.g., coins) according to the protocol being employed. Miners record the ledger (e.g., blocks) to the blockchain and, in at least some instances, the network is self-managed.

Implementations may also support the use of any suitable distributed ledger (e.g., blockchain) and/or smart contract platform, including but not limited to the platforms provided by Counterparty, Ethereum, and the Eris Industries software stack. In some implementations, the smart contract(s) may be built at least partly using Ethereum's high level languages and may be run on any of the software platforms listed above, or others. For example, the Eris Industries platform uses a Tendermint proof-of-stake blockchain and Counterparty uses their own blockchain that is powered by proof-of-burn XCP currency. Implementations may employ distributed ledger(s) that support proof-of-work, proof-of-stake, proof-of-burn, and/or other methodologies. For example, consortium blockchains may be governed by proof of stake rules. For example, a consortium member may provide a stake to "buy in" to a blockchain, and that stake may be surrendered if the consortium member violates terms of use of the blockchain. In some cases, a computing system can include verification information generated using a proof of stake protocol. For example, each of the computing systems can be issued a respective unique token or unit of cryptocurrency. Tokens or items of cryptocurrency are only issued to those with a "stake" in the system (e.g., trusted entities in the system. When generating the block, the computing system can include information in the block that demonstrates that it is in possession of a token or unit of cryptocurrency. For example, the computing system can generate a computational hash of its token, and include that hash in the block. Based on the computational hash, recipients of the block can ascertain that the computing system generated the block (e.g., by applying a second computational hash to the hashed token or unit of cryptocurrency, and verifying that it corresponds to a known value), and thus, can ascertain that the block has been generated by a trusted entity of the system.

In some embodiments, the interchange system may enable users to make transfers of confirmed blockchain digital currency coins (also described as coins) in a secure ecosystem, to reduce or eliminate the risk of infiltration by outside networks, and to enable secure digital transactions. In this way, the system allows entities (e.g., companies, financial institutions) to increase their trust product through the use of secure elements in a physical device such as a smartphone, the token device described below, or other suitable type of secure element container that generates transaction messages, sends blockchain requests, and requests the confirmation of digital currency coin transaction logging in the interchange system.

Thus, a blockchain can be understood to refer to an immutable public ledger of all transactions that have ever been executed in one or more contexts (e.g., negotiable instrument transactions, digital currency transactions, funds transfers, etc.). A blockchain grows as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

In general, a smart contract may include executable code that is configured to access the treasury accounts on a distributed ledger system, as well as the various external systems (e.g., institutional systems) of the institutions participating in the distributed ledger-based interchange system. The smart contract(s) may be on the distributed ledger system or may be external to the distributed ledger system.

In different embodiments, examples described herein can be related to assets, digital assets, Bitcoins, Dogecoin, Litecoin, Ethereum, or other digital currencies that exist or will be created/mined in the future, and/or other types of electronically transferable assets with respect to an insurance claim "payout" or other release of funds. However, it is specifically noted that the concepts apply to any type of blockchain asset or traditional assets such as stock equities, bonds, commodities, real estate, insurance contracts, legal contracts, dollars, etc. Using the proposed technology, parties do not need to rely on manually prepared agreements and/or services of third-party mediators (e.g., financial brokers, agents, lawyers) to secure an agreement for access to resources and capital, all of which are costly, time-consuming and/or susceptible to errors and data security breaches. It can be appreciated that implementations of the techniques and technologies described herein may include the use of solid-state circuits, digital logic circuits, computer components, and/or software executing on one or more input devices. Signals described herein may include analog and/or digital signals for communicating a changed state of auction data, release of funds from the blockchain, or other information pertaining to the transaction data blockchain.

For purposes of clarity, an overview of one embodiment of the proposed systems and methods is illustrated with reference to FIG. 1. In FIG. 1, an example of an implementation of the proposed system is shown as executed using a first mobile computing device ("first device") 180 that includes a local funding system or is in communication with a remote funding system. In different embodiments, an area 100 may include various structures, such as a first residence 102 and a second residence 104. As used herein, the term "building" or "structure" can refer to any kind of building, such as a home, or other residential building, a shed, barn, a commercial building or any other related structures. A building typically can include a roof, room, walls, support structures, windows, or other features. In some cases, the primary structure can be associated with additional secondary structures, features, or property that may be disposed adjacent to or otherwise near the primary structure. In FIG. 1, the residences (102, 104) are shown in an undamaged state 106 before a tornado 130 and a subsequent damaged state 120 following the impact of the tornado 130.

As will be discussed in greater detail below, structures such as the residences (102, 104) in FIG. 1 can include one or more embedded sensors. For purposes of this application, embedded sensors refer to sensors that are integrated into the foundational portions of a structure, such as in the flooring, roofing, walls, windows, doors, or other building materials. Such embedded sensors are typically incorporated into the structure during the initial construction of the building. The embedded sensors can be included in a masonry build, or during a 3D printed construction process. As a general matter, at least three methods can be used to combine dielectric with conductive parts in order to produce structures with embedded sensors: (a) hybrid approaches, e.g., combining printed parts with non-3DP fabricated structures, e.g., regular wiring, printed circuit boards or entire sensors that are inserted into or between the various building blocks used to construct the building; (b) conductor infusion, e.g., printing channels in otherwise non-conductive materials by arbitrary 3DP methods with subsequent infusion of conductive inks; (c) multi-material printing, e.g., combining the use of conductive and non-conductive filaments, predominantly by fused deposition modelling (FDM), (d) direct 3DP of materials such as 3DP cement that are composites and already include a mixture of sensors that will be deposited in layers forming the structure, and (e) 3DP printing of a building that involves reiterative cycles of printing using a first 3DP mixture (e.g., cement), followed by a pause in which a second 3DP mixture is used to print a sensor along the cement layer, followed by a return to printing using the first 3DP mixture. These embedded sensors can include a variety of sensor types configured to collect data representing a wide range of information, including strain gauge sensors, capacitive sensors, magnetic sensors, piezoelectric sensors, electrochemical sensors, as well as hybrid sensors such as whisker-inspired tactile sensors, and other sensor types.

As noted above, in different embodiments, the proposed systems enable insured parties to obtain payout or otherwise cause transactions to be executed via an electronic interchange. As a general matter, an insured party or member refers to the policyholder or other beneficiary of a claim through their insurance company. In some embodiments, the first device 180 can monitor sensor data captured by embedded sensors 144 at the member's home (e.g., second residence 104) for one or more portions of the home. The sensor data is provided to the local and/or remote instance of the claim management system as real-time data 146 in a damage report. As an emergency situation (shown here as tornado 130) approaches or occurs at area 100, the sensor data can reflect one or more conditions 124 that may be used to determine that damage has occurred, which can trigger an automated release of funds 150 from the local and/or remote funding system. This can occur with or without a connection to a communication network. Once the funds are released, the user will have immediate access, such as via first device 180. For example, first device 180 may allow funds access through an app 160 running on the first device 180 which can be used by the homeowner to initiate repair operations 170 or otherwise support the member during and after the crisis In general, a communication network may comprise a traditional wired network and/or a wireless network usable by portable devices such as portable computers, smartphones, etc. Therefore, policy holders may interact with the system by operating mobile devices such as a portable client computer, tablet, wireless telephone (such as a smartphone) and/or other devices capable of communicating with communication network or communication module. The mobile device may communicate with the insurance claim processing system over a wireless connection with a cellular or internet data routing system, such as a WiFi, 3G, 4G, or 5G network. In one embodiment, the first device 180 may have web browsing capabilities such that communication with a funding module may be made over a standard web interface. Alternatively, or concurrently, the first device 180 employed by a policyholder to communicate with the system may incorporate a series of instructions for interacting with the system. For example, in one embodiment first device 180 may include a downloaded program or applet that allows the policy holder to access his or her specific insurance policy account(s) while offline or while connected to the system. In some embodiments, the first device 180 can also include a separate or integrated mobile device application 160 that may include a sensor widget having any necessary libraries or data to work with the sensor data being obtained by sensors of first device 180. In the discussion below, it is assumed that the policy holder already has a policy with the insurance company that uses the insurance claim processing systems described herein.

Figure 2:
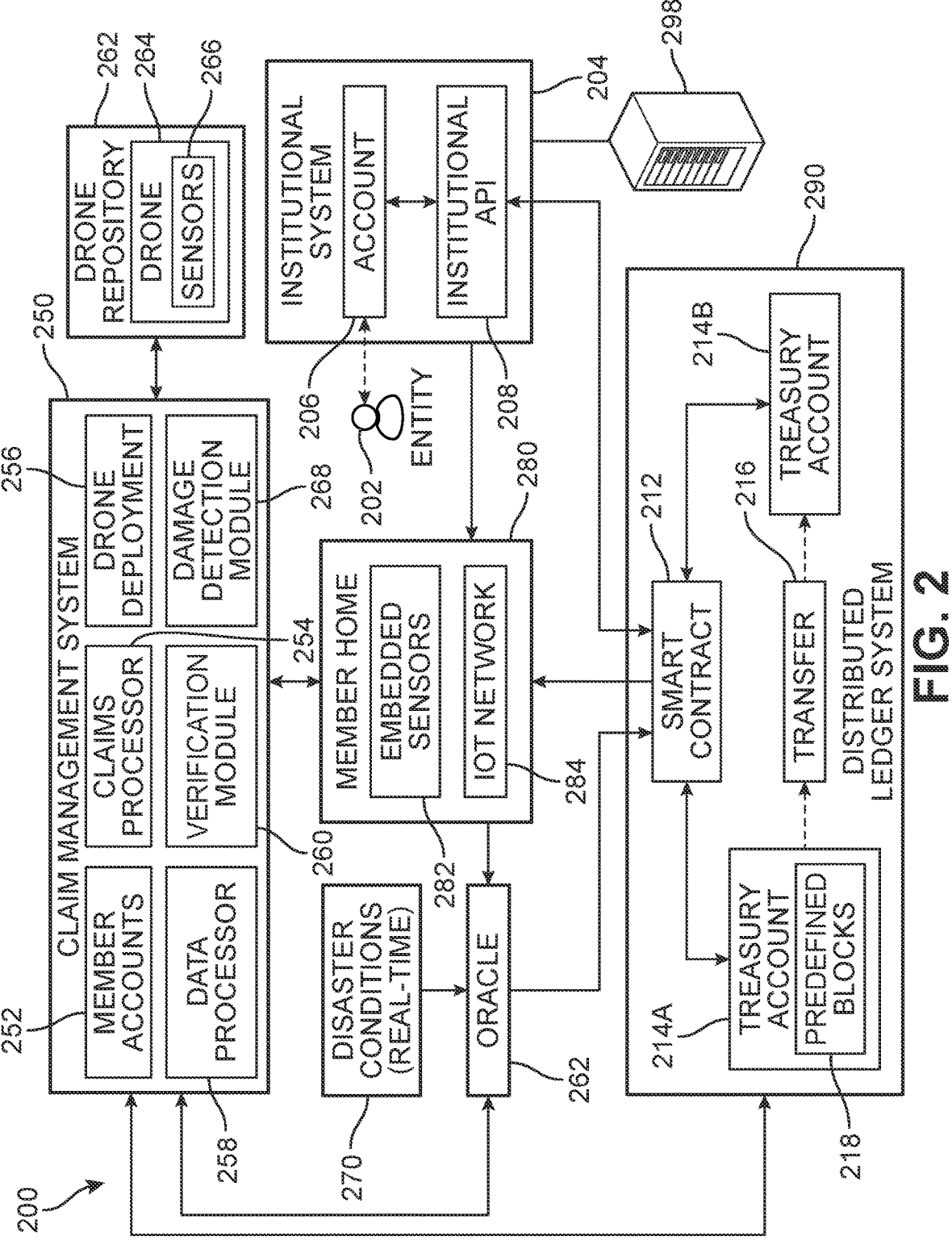
FIG. 2 is an overview of an environment for a claim management system, according to an embodiment.

Referring now to FIG. 2, a claim processing environment ("environment") 200 in which the proposed embodiments may be implemented is shown. In the embodiment of FIG. 2, the environment 200 includes an optional electronic interchange and smart contract system ("distributed ledger system" or simply "blockchain system") 290. However, in other embodiments, payments can be automatically generated and delivered using standard bank transfers or direct deposits, or the automated printing and mailing of a check to the member from the insurer.

In cases where the blockchain system 290 is used, the proposed embodiments may be implemented to perform the automated release of emergency funds via the blockchain. In a first example, a registered policyholder (insured) entity 202 may reside in an area that experiences an emergency condition (e.g., hurricane, wildfire, act of war, terrorist attacks, disease outbreak, tornado, volcanic eruption, flood, earthquake, storm (wind, rain, and/or snow), drought, etc.), as identified by a disaster conditions module 270. In such cases, one or more smart contract 212 for members located in region 250 can be engaged, depending on the sensor data that is received during and/or following the emergency condition, based on the terms and conditions that apply for each insurance policy. In some embodiments, an oracle module ("oracle") 262 are in communication with an environmental conditions database (e.g., weather reports, environmental disaster agencies, sensors in the region, etc.) associated with the disaster conditions module 270 that provides real-time updates regarding the region's status.

In different embodiments, a policyholder can enroll or otherwise consent to the smart contract-based claim process. In some embodiments, the impacted member home 280 includes embedded sensors 282 that collect data that is shared with the claim management system 250, for example in conjunction with an IoT (Internet of Things) network 284. In one example, an electronic work-file for a claim based on the sensor data may be automatically created by the claim management system 250. In some embodiments, this file can also be transmitted to the blockchain system 290 using information already stored in member accounts 252, which may include and/or be configured to operate within parameters established by member data, claim rules, policy information, or other data. In different embodiments, oracle 262 is configured to collect such data, as well as other information related to terms and conditions for each smart contract such as sensor data, in order to ensure the blockchain system 290 can verify real-world occurrences or events. For example, the oracle 262 can refer to a service that provides a data feed to the smart contract 212 and could also provide a unique key as well. The oracle 262 can be a virtual machine or human agent that finds and verifies real-world occurrences or events and submits this information to one or more of the distributed ledger system 290 and/or the system to be used by the smart contracts. The oracle 262 can receive the data and format it or modify it in preparation for providing or submitting to the blockchain smart contract.

It is to be understood that a wide variety of oracles outside of sensor data may be utilized (e.g., weather conditions, stock exchanges, GPS data providers, date/time providers, crowdsourced decentralized data providers, news providers, activity monitors, RSS feeds, other oracles, etc.). In various embodiments, RSS feeds may be from sensor-based devices such as a mobile phone (e.g., with data from many such devices aggregated into a feed), may be social network (e.g., Twitter, Facebook) or news feeds (e.g., which may be further filtered down by various parameters), may be market data feeds and/or the like feeds. In one example, the smart contract is configured to communicate with an oracle that is configured to make a request to obtain a particular feed's data stream.

As noted earlier, smart contracts contain value and only unlock that value if certain predefined conditions are met. When a particular value is reached, the smart contract changes its state and executes the programmatically predefined algorithms, automatically triggering an event on the blockchain. The primary task of oracles 262 is then to provide these values to the smart contract in a secure and trusted manner. Blockchains will not typically access data outside their network. The oracle 262 can in some cases receive information via a data feed provided by third party service that is designed for use by the smart contract. The oracle 262 will provide the external data and trigger smart contract executions when the pre-defined conditions as described herein are met, such as a particular set of data obtained via embedded sensors 282.

As a general matter, a blockchain may include any number of blocks, 1 through N where N is any number. A block may include, or be associated with a list of transaction(s). The transaction(s) may include the data stored in the blockchain, and each block may store any number of records each indicating when and in what order the transaction(s) are applied to modify the data stored in the blockchain. Each block may also include a pointer that identifies a previous (e.g., or next) block in the blockchain.

To provide further context for the present disclosure, a high-level discussion of blockchain technology is now provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to-be-created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

Thus, in different embodiments, the smart contract 212 can be configured to execute when one or more preset conditions have been met. For purposes of the present embodiments, a smart contract term may typically include the detection of structural conditions in a 3DP house. In some embodiments, the damage detected by the embedded sensors and identified by damage detection module 268 can be sufficient to serve as a trigger for claims processor 254 to execute a payout. In other embodiments, a disaster event must also be associated with the region in which the 3DP home is located, whereby there is a high likelihood that conditions related to the disaster event caused the damage that was detected by the damage detection module 268. In some embodiments, the types of damage that can be detected based on the data collected by the embedded sensors can include (1) flood damage; (2) storm damage; (3) fire damage; (5) tsunami damage; (6) high temperature damage (e.g., above 102 degrees for longer than 48 hours (or other window of time that is selected to allow for the damage to be logically attributed to the disaster event), etc. It should be understood that this list is provided for illustrative purposes only, and any other damage condition may be used to cause the execution of a smart contract. In addition, in different embodiments, the system is configured to receive oracle information and determine whether a disaster event has occurred, and classifying the type of disaster event it is (based on pre-defined categories). In some embodiments, further sub-classifications can be determined by the system based on the level or degree of severity that has been assigned to the event.

In some embodiments, the smart contract may take actions (e.g., transfer assets, transfer collateral) based on data provided by one or more oracles. These data can be understood to serve as implicit claims that are generated automatically on behalf of the members in the region when certain environmental conditions occur. In one embodiment, contract terms may include a specification of the value of an asset based on data provided by an oracle. In another embodiment, contract terms may include a specification of an action to take based on weather and/or the like (e.g., natural events such as flood, earthquake, volcanic eruption, lava flow; political events such as political unrest, war, terrorist attacks) conditions based on data provided by an oracle, as well as property-specific sensor data. In another embodiment, contract terms may include another smart contract (e.g., that acts as an oracle) resulting in a cascading smart contract. For example, a crowdsourced decentralized weather provider oracle may obtain (e.g., from smartphones of participating users) crowdsourced weather data (e.g., temperature, rainfall, humidity), and provide such (e.g., combined) weather data for the smart contract. The smart contract may specify that an order to trigger the release of the block if the crowdsourced weather data matches specifications and sensor data for the insured member's home indicates some damage has occurred in a time period that coincides with or is shortly following the disaster event. In another example, a crowdsourced decentralized usage tracking provider oracle may obtain (e.g., from smartphones of participating users) crowdsourced usage data (e.g., via social media services people utilize), and provide such data (e.g., local residents discussing an impending disaster) to trigger the release of funds for a member in the region whose structure is determined to have been damaged based on data obtained by the embedded sensors 282.

In different embodiments, the transaction can be stored in a virtual ledger such as a blockchain. In other words, in some embodiments, the distributed ledger system is or comprises one or more blockchains. Accordingly, the distributed ledger system may also be described as a blockchain network. The distributed ledger system may also include one or more smart contracts.

The parties may use a blockchain of the type used to record Bitcoin and other types of transactions and agreements. The recording of information in the ledger could also be for hyperlinks, legal documents, ledgers, identities, regulatory documents, property interests, and the like. The virtual ledger in one example comprises a plurality of encoded blocks. In one example, each block is encoded or hashed such that it incorporates the data in blocks that came before it. In FIG. 2, transfer 216 of predefined blockchain funds 218 from one account to another (214A to 214B) occurs automatically once the terms of the smart contract 212 are fulfilled, creating a transaction event.

Thus, in some implementations, the insured's policy may be a smart contract that executes to automatically transfer value to the user in response to detecting a structural deviation via embedded sensors 282. The smart contract may include logic to determine the amount of the value to be transferred under various circumstances, in relation to the various types of deviations. The smart contract may also keep track of payments made by the user (e.g., monthly premiums) to maintain the policy. In some implementations, the operational model for the user device may be stored on a blockchain or other type of distributed ledger. The policy may also be stored on the blockchain. In instances where the policy is implemented as a smart contract, the smart contract may execute on the blockchain.

In one embodiment, the smart contract 212 is also configured to cause the funds to be moved to an external financial provider (institutional system 204) such as a bank or credit union, per the member's instructions. In FIG. 2, member 202 may have an account 206 with an institution such as a bank, credit union, and so forth, while another entity may have an account with another institution or the same institution as member 202. Each institution may operate an institutional system 204. The institutional system may include any appropriate number of type of computing device, such as server computer(s) 298. The member accounts may be maintained on an institutional system for a first institution, and the insurer's accounts may be maintained on an institutional system for a second institution. In some instances, the systems may be node(s) involved in blockchain mining activities as described herein.

In this example, the member 202 maintains an account 206 which is funded by the smart contract through an institutional API 208, thereby processing the 'claim' and releasing the funds to the member 202. It may be appreciated that at no point in this process was a manual input by an agent or other person required that could be associated with a delay in the delivery of the funds. Instead, as soon as the conditions for the smart contract are met, the insured automatically receives the preset payout corresponding to that smart contract. For example, in some embodiments, a signal may be sent to the institutional systems 204 indicating that account of the sending entity may be debited the value of the transaction, and the account of the receiving entity may be credited the value of the transaction. Settlement may occur between the treasury accounts of the sending and receiving institutions, and the treasury accounts present on the distributed ledger system. In the settlement, value may be transferred from the treasury account of the sending institution to the treasury account of the receiving institution. The settlement may be performed in real time with respect to receiving the request for the transaction, with respect to crediting and debiting the receiving and sending entities accounts on the institutions. In some embodiments, each of the institutions participating in the distributed ledger-based interchange system may maintain an amount of funds in their respective treasury account. A number of digital currency coins may be allocated to an institution, such that a value of the allocated coins corresponds to the funds in their treasury account. Settlement may include the transfer of the appropriate number of coins from the sending institution's treasury account to the receiving institution's treasury account. In some implementations, the coins may be assigned a fixed value with respect to another (e.g., non-digital) currency, such as United States Dollars (USDs), Euros, and so forth.

Figure 3:
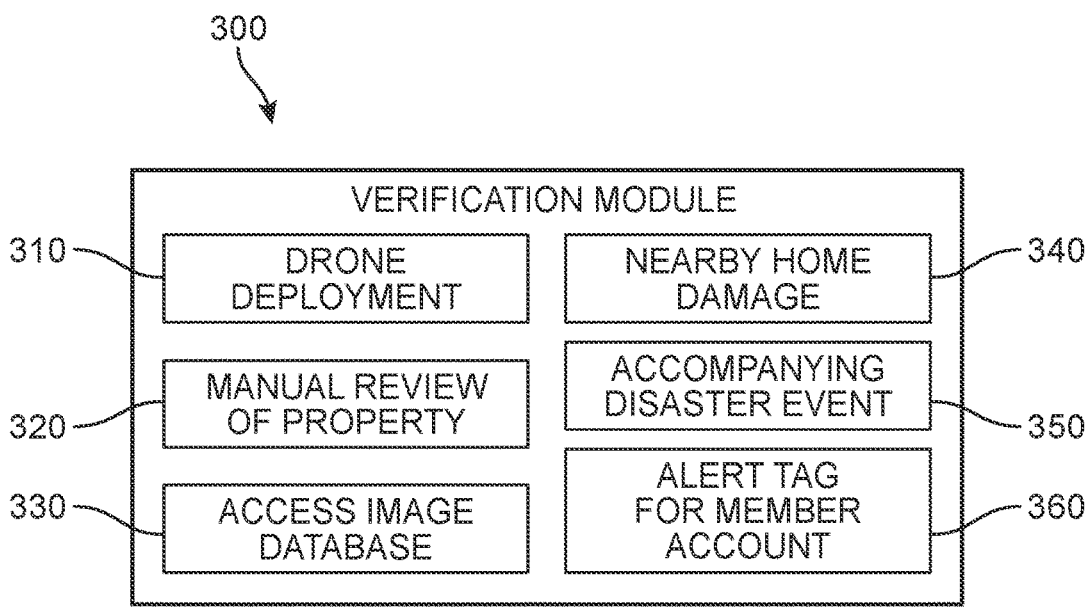
FIG. 3 is a diagram presenting verification operations that can be performed or caused by the claim management system, according to an embodiment.

As noted earlier, the proposed environment 200 also provides a mechanism by which a verification process can be initially triggered in response to the received sensor data, particularly in cases in which damage is detected but no accompanying disaster has occurred in the region, or where damage is detected but the data is ambiguous or otherwise unclear. Referring briefly to FIG. 3, some examples of operations that can be triggered or performed by a verification module 260 of the claim processing system are shown. In different embodiments, the verification module 260 can determine the damage report indicates damage and (a) the damage is identified but with a confidence level below a pre-defined threshold, (b) damage is indicated but the type and/or extent of damage is not ascertainable based on the data received from the embedded sensors, (c) damage has been identified with sufficient confidence but the relationship between the damage and some covered event under the insured member's policy is not clear (e.g., the damage might have been caused by a non-covered event or by the owner's own actions). In such cases, the verification module 260 is configured to cause one or more verification operations to be performed.

As shown in FIG. 3, in different embodiments, some of these verification operations can include (a) automated deployment of a drone or other unmanned aerial vehicle (UAV) to capture up-to-date images and other sensor data of the property that can be used to substantiate the sensor data;

(b) automated notification to an employee or other agent of the insurer, requesting fulfillment of assignment in which a manual review of the property is performed (in-person visit or virtual visit); (c) automated request to an image database that has up-to-date (post damage) images of the property to substantiate the sensor data; (d) automated review of data for other properties in the neighborhood of the target property to determine if there is correspondence between the damage to nearby homes (i.e., consistency between the two sources of data, the data sets are in accord, similar types/degree of damage, etc.) that can substantiate the damage at the target property; (e) automated request for event data from disaster databases to confirm a covered event occurred in correspondence with the damage to support a claim for coverage; and (f) adding an alert to the member's account in which a follow-up is recommended while a portion of the payout is nevertheless authorized.

Returning to FIG. 2, one example of an operation of verification module 260 is described. In some embodiments, upon receiving data from embedded sensors 282, and identification of damage to the member home 280 by the damage detection module 268, the verification module 260 can initiate a review or follow-up by transmitting a control signal to a drone deployment module 256. In different embodiments, the drone deployment module 256 can cause a deployment of an aerial drone 264 held in a drone repository 262 in the region to the member home 282. Onboard sensors 266 can capture data associated with the member home 280, which will be sent to a sensor data processor 258. In different embodiments, the sensor data processor 258 is configured to identify areas of likely damage based on the received drone sensor data. The verification module 260 can determine whether the drone sensor data supports the damage report generated by the damage detection module 268. If there is a correspondence (high likelihood of agreement) between the two sources, the claims processor 254 can proceed with an automated payout, as described herein. If there is a discrepancy between the two sources, the claims processor 254 can generate a notification or alert that is added to the member's account and/or a hold can be placed on the claim until an additional follow-up and/or manual assessment of the damage can take place. In other words, if the information does not match, the claim processing system may automatically flag the damage as unsubstantiated, and add a request to the claim for a follow-up evaluation.

In different embodiments, the damage detection module 268 can include a damage classifier or other program or algorithm that is used to classify images and/or non-visual sensor data according to the degree and/or type of damage the structure has sustained. In some embodiments, damage detection module 268 includes one or more machine learning models. In one embodiment, damage detection module 268 could include a convolutional neural network. In other embodiments, damage detection module 268 could comprise any other algorithm (or set of algorithms) from the field for machine learning and/or machine vision. As a general matter, these images and sensor datasets can be obtained from aerial images and the embedded sensor data, which can offer real-time data for the target location. For example, in some embodiments, data can be collected during manned or other unmanned aviation fly-bys over the target location to build a better localized and instantaneous report of near-current damage conditions. This can include raw weather data collected by some type of sensor suite including surface and airborne observations, radar, lightning, satellite imagery, and profilers.

In some embodiments, damage detection module 268 uses machine learning (ML) techniques, such as deep learning that includes classification, clustering, and/or other techniques. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different types of damage. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur. All of these AI systems process enormous amounts of data; for example, Caffe can process over 60 million images per day with a single NVIDIA K40 GPU.

Moreover, in some implementations, the process may employ an estimation engine that uses ML techniques to generate repair cost estimate information. In some embodiments, such techniques may include supervised and/or unsupervised ML techniques. In some implementations, the estimation engine may employ a ML-based model that is trained using training data that includes prior cost estimates and actual cost information. Accordingly, the estimation engine may be trained over time to develop a more accurate cost estimate based on the previous divergence between estimates and actual cost.

In some embodiments, the drone repository 262 includes or refers to an aerial image capture service (AICS) such as Geospatial Intelligence Center (GIC) or other image collection entity initiates an aerial imagery capture session for a target region. AICSs give insurers and associated damage assessment systems the ability to search an address and view before and after aerials images of properties within the impacted area. Such high-resolution aerial imagery provides insurers with vital information to better serve policyholders, speed up the claims resolution process, and aid in improved fraud detection.

In different embodiments, data processor 258 can implement various image processing algorithms and/or software that may be used with drone-captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Any suitable communication platform and/or protocol may be utilized for communication between the controller and the drones. The drones may be manually controlled or autonomously controlled. In some embodiments, a global positioning system (GPS) navigation system may be used to facilitate the flight of the drone to the target property. For example, controller may obtain location information recorded and transmitted by the service's sources. The controller may be configured to command the drones to fly to the house and capture sensor data. Accordingly, computer readable medium may include instructions for receiving this location information and completing the drone delivery to the target location(s).

In different embodiments, aerial drones can include onboard computing systems ("aerial systems") that enable the capture of data associated with the target structure. An aerial system may comprise various systems and components that are disposed within an autonomous aerial vehicle. As noted above, the aerial system may include one or more cameras for capturing images and information about a building structure. The camera may comprise any kind of camera, including any kind of digital camera and/or range imaging camera. Range imaging cameras include any type of device that can capture range information or range images corresponding to an object in the viewing area of the camera. As used herein, "range images" provide a 2D array of values indicating a depth (or distance measurement). Some exemplary range imaging devices may include structured-light 3D scanners and time-of-flight cameras. Using a time-of-flight camera, the system can capture range images of a scene that can be used to build a 3D model of objects in the scene, such as building structures.

The aerial system can also include a GPS receiver for receiving GPS information that can be used to determine a GPS location for the aerial vehicle. In some embodiments, the aerial system may also include sensors for measuring orientation, altitude, and/or acceleration. For example, an aerial system can include a gyroscope, an altimeter, and an accelerometer. In some embodiments, the aerial system can include an altitude and heading reference system (AHRS). Using these devices, the orientation, heading, and height of the aerial vehicle (and of camera(s)) can be determined. This information, when used with a GPS location for the aerial vehicle, can be used to infer the location of one or more points in an image taken from the aerial vehicle as described in further detail below.

In different embodiments, aerial system can also include an image capture and processing system, also referred to simply as processing system. A processing system may be used to store, process, and transmit image information.

Additionally, in some cases, a processing system can receive GPS or other coordinate information about one or more target locations. To facilitate these tasks, image capture and processing systems may include one or more processors as well as memory. Memory can store instructions for programs that facilitate storing, processing, and transmitting image information. Images and other sensor data captured by the drone 264 can then be transmitted over a network to the claim management system 250 for further processing.

Figure 4:
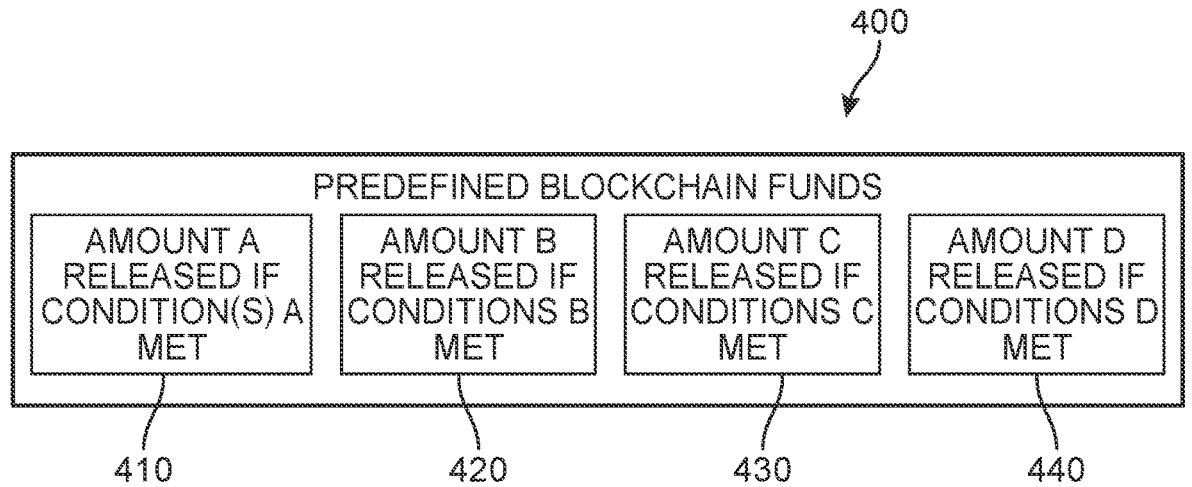
FIG. 4 is an example of predefined blockchain funds established for different damage events, according to an embodiment.

In different embodiments, the smart contract 212 can be configured to cause different block values to be released in response to the data submitted by oracle 262. An example is presented with reference to FIG. 4, where a series of predefined blockchain funds 400 is depicted. A first block 410 comprises an Amount A that will be released if condition(s) for "A" are met. Similarly, a second block 420 comprises an Amount B that will be released if condition(s) for "B" are met, a third block 430 comprises an Amount C that will be released if condition(s) for "C" are met, and a fourth block 440 comprises an Amount D that will be released if condition(s) for "D" are met. In this example, the amounts A, B, C, and D differ.

For example, amount A is less than B, B is less than C, and C is less than D. Thus, the maximum funds that can be released is D, and the least funds that can be released is A. The specific terms that trigger execution of the smart contract for each of these blocks can be understood to differ. For purposes of illustration, the first block 410 can be released via the smart contract terms when a Category 2 hurricane has impacted the region in which an insured member's house is located, and embedded sensor data indicates roof damage (e.g., a partial loss), the second block 420 can be released via the smart contract terms when a Category 3 hurricane has impacted the region and the embedded sensor data indicates the basement has flooded (e.g., a partial loss with consideration of damage that could have occurred to furniture and other possessions etc. in the basement), the third block 430 can be released via the smart contract terms when a Category 4 hurricane has impacted the region (e.g., a total loss, so a greater amount than first block 410) and the fourth block 440 can be released via the smart contract terms when a Category 5 hurricane has impacted the region and the basement and ground level have flooded (e.g., a total loss for the basement and partial loss for the ground floor and furniture and other possessions). In other words, in different embodiments, the system can be configured to modulate the amount of funds that will be automatically released based on the (a) type of disaster, (b) intensity of the disaster, (c) portion of the structure that has received damage based on embedded sensor data, and (d) the extent of the damage in that portion based on the embedded sensor data. In another example, the higher amounts may be released when multiple damage conditions are detected, such as following a flood and an earthquake, while lower amounts are released when only one damage condition is detected. In different embodiments, the system is configured with preestablished thresholds or levels that can serve as demarcations between different payout amounts.

Figure 5:
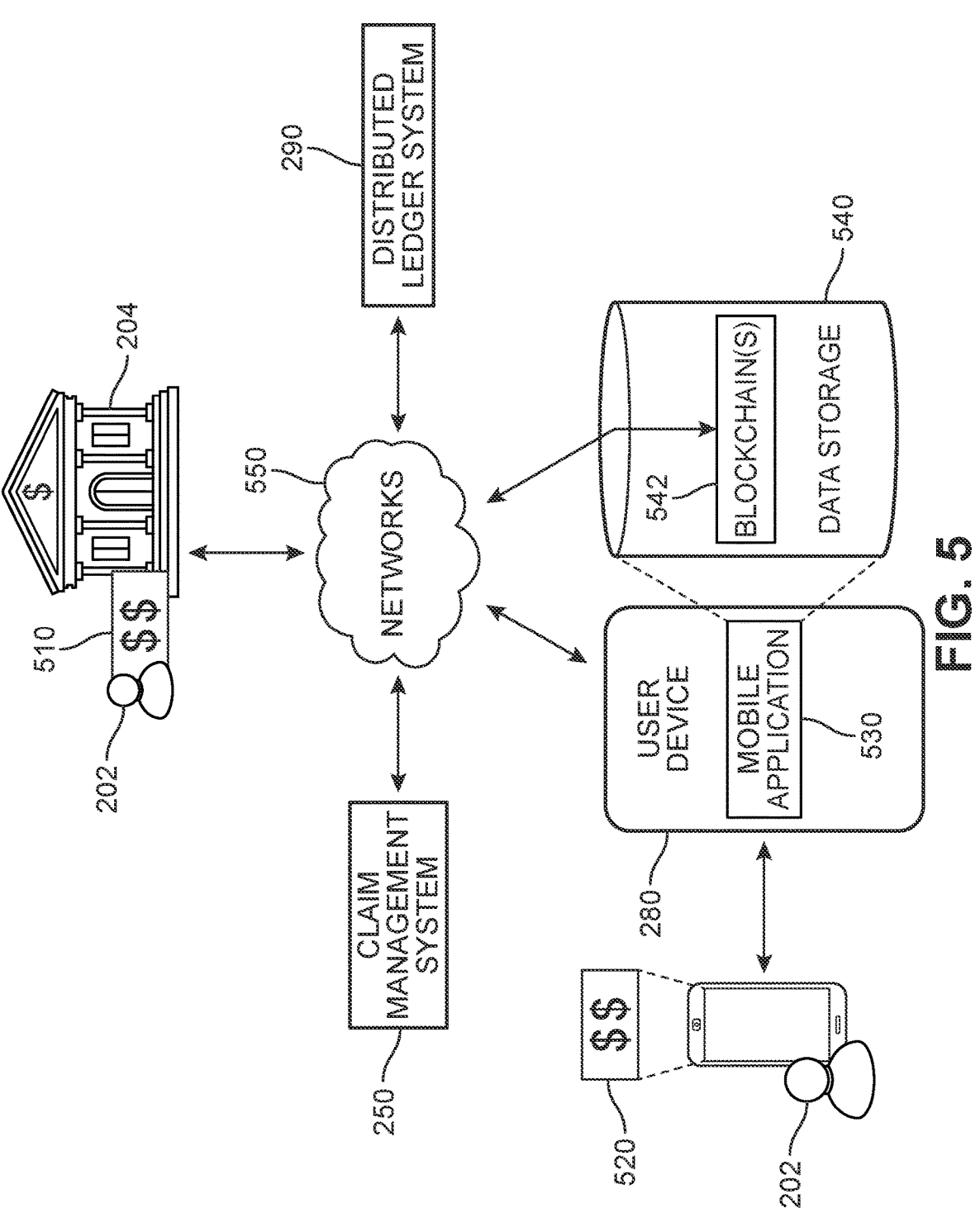
FIG. 5 is a schematic diagram illustrating a smart contract environment triggered in response to embedded sensor-based damage detection, according to an embodiment.

For purposes of clarity, FIG. 5 presents a schematic overview of one embodiment of the proposed systems. In this example, it can be seen that in some embodiments, when the distributed ledger system 290 receives information such as via oracles and claim management system 250 over a network 550, the system 290 causes execution of a smart contract that releases a block of funds 510 and transfers the funds 510 to institutional system 204 of the insured member 202. In some embodiments, the app 530 includes data storage module 540 which stores a local version of the smart contract system. The app 530 can receive confirmation that conditions of the smart contract for the member 202 have been met and trigger an execution of the smart contract, releasing blockchain 542 as funds 520 via the user device 280.

Figure 6:
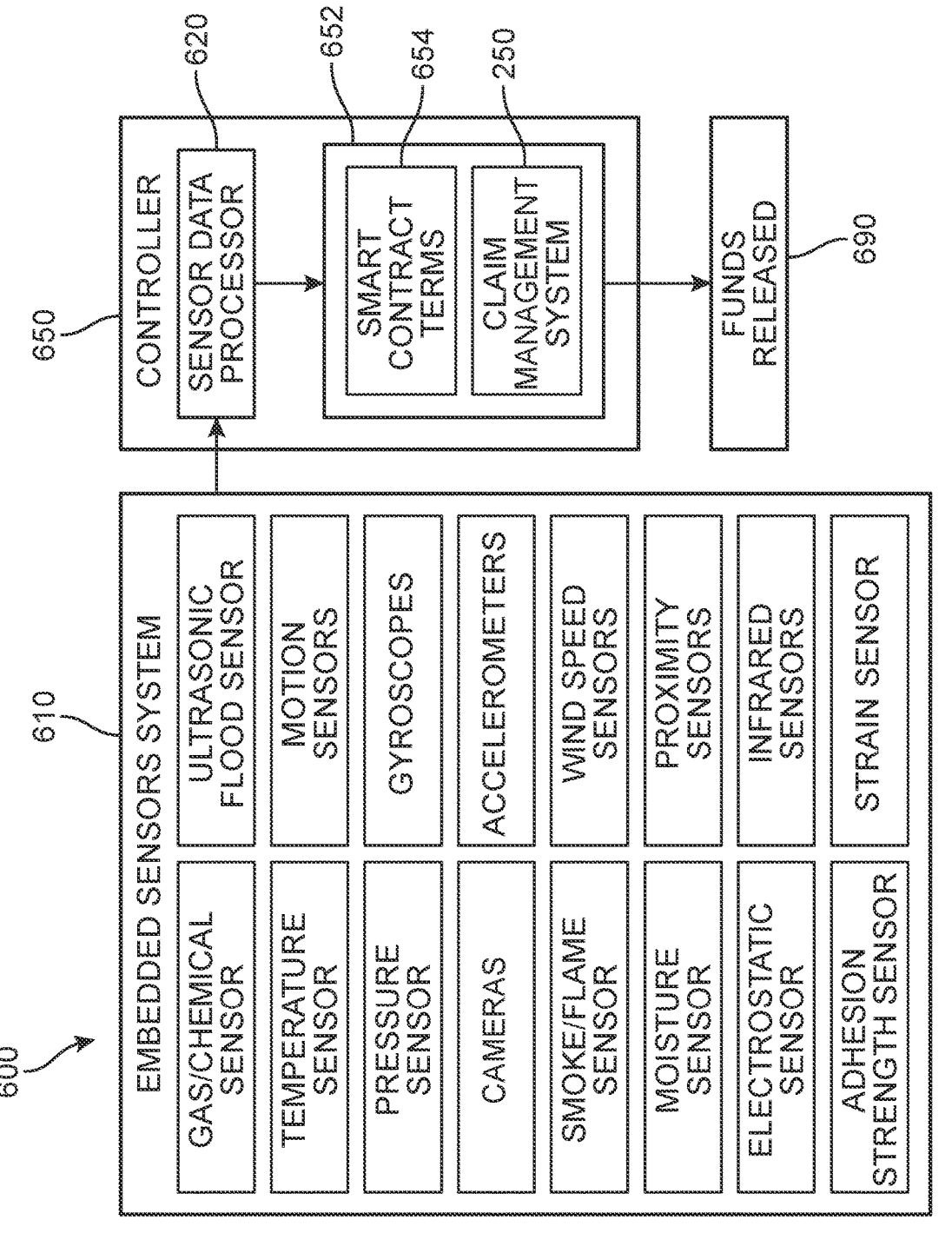
FIG. 6 is a schematic diagram presenting various possible embedded sensor types and a funds release process, according to an embodiment.

For purposes of illustration, a schematic flow diagram of an embodiment of the second (local) process is depicted in FIG. 6. In the embodiment of FIG. 6, embedded sensors system 600 includes a plurality of sensor components ("embedded sensors") 610 that are embedded in the material of the structure (e.g., see FIGS. 7-10) and a controller 650. Furthermore, while in some embodiments various modules and components of embedded sensors system 600 can be configured to connect to a network, it can be appreciated that the system 600 is able to function and execute smart contracts while offline. In other words, a user can rely on the embedded sensors system 600 as an independent, comprehensive system that is able to work in areas without a network or in situations where the user is unable to access any such connection.

In different embodiments, the embedded sensors 610 can include one or more types of a component, device, module, machine, or subsystem whose purpose is to detect events or changes in its environment and convey the detected information to a sensor data processor 620. The embedded sensors user device running offline app services can include some or all of these sensor devices. As shown in FIG. 6, some non-limiting examples of such sensors include (a) Smoke, Gas and Alcohol (and/or other chemicals) sensors; (b) Temperature sensors; (c) Pressure sensors; (d) Cameras and other image and/or light sensors; (e) Smoke/Flame sensors; (f) Moisture and/or Humidity sensors; (g) Electrostatic sensors; (h) Flood sensors such as ultrasonic sensors; (i) Motion/speed sensors; (j) Gyroscopes; (k) Accelerometers; (l) Wind Speed sensors; (m) Proximity sensors; (n) Infrared and Heat sensors; (o) adhesion strength sensors; (p) G-force and/or strain sensors; (q) mechanical sensors; (r) electrical resistivity sensors; (s) piezoresistive sensors; and/or (t) IoT network devices. In addition, in some embodiments, sensors 610 can include ultrasonic sensors, touch sensors, aerosol characterization sensors, magnetometers, color sensors, tilt sensors, and flow and level sensors. Thus, in different embodiments, sensors 610 may collect data regarding location, wind, heat/cold, precipitation, smoke, etc. around the user. Additionally, or alternatively, in some embodiments, the sensors 610 may be configured to collect atmospheric data, such as atmospheric temperature and/or atmospheric pressure. Monitoring such parameters may enable the system to detect dangerous weather conditions, such as storms, etc.

In some cases, embedded sensors 610 can refer to one or more of a stationary internet of things (IoT) device(s) ("smart sensors") that communicate over a network. Smart sensors could comprise any of a variety of different IoT devices and other smart devices that may include one or more sensors. The smart sensors can be stationed at other locations in the area.

In different embodiments, data collected by embedded sensors 610 can be used by the claim management system 250 to identify damage conditions. In FIG. 6, data is transmitted to the sensor data processor 620 of controller 650 which prepares data for use by a local ledger 652. The data is used to determine, in conjunction with stored smart contract terms 654, whether the conditions have been met, thereby causing a release of funds 690.

Figure 7:
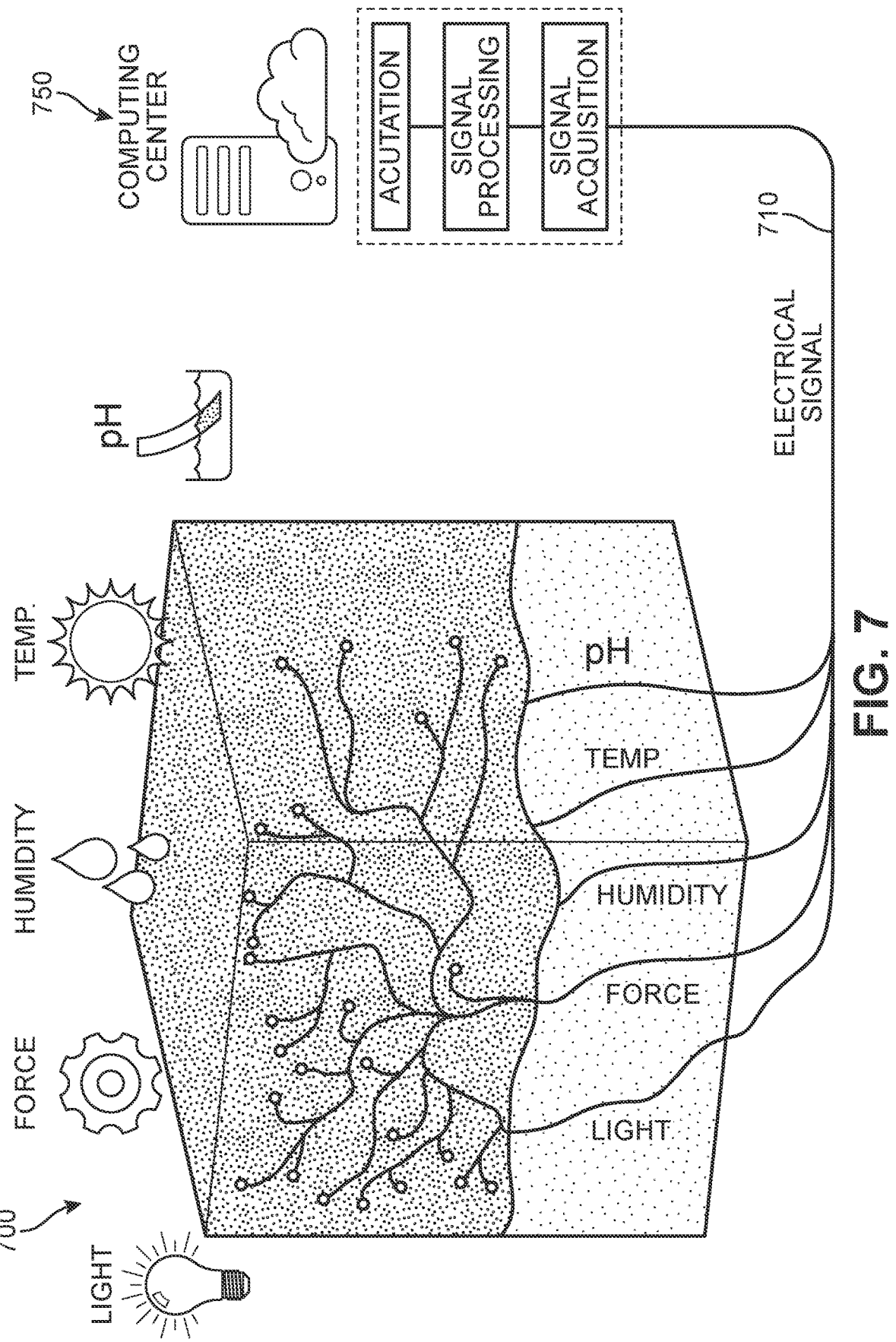
FIG. 7 depicts an example of a composite building material that incorporates one or more sensor materials, according to an embodiment.

As described herein, various mixtures and other materials in which sensors have been embedded or otherwise incorporated can be used during construction of a structure such as a residence or other building. Throughout this application, such structures can also be referred to as self-monitoring structures. For purposes of illustration, one non-limiting example of such a material is schematically depicted in FIG. 7. In this example, a self-sensing concrete block 700 is shown. As a general matter, self-sensing concrete includes a conductive network constituted by functional fillers acts as "nervous system" to transduce signals stimulated internally and externally to the computing center, i.e., "brain."

Standard or conventional concrete is usually produced by mixing water, aggregates, and cement and allowing them to harden, concrete is a durable, affordable, aesthetic, and readily available composite material. However, physical effects, including surface abrasion/erosion, cracking, aging, temperature variation and crystallization of salts in pores, and penetration of water and fire or frost actions, associated with deleterious chemical effects such as alkali-aggregate reaction, carbonation, sulfate attack, and corrosion of reinforcing steels, would cause the deterioration of concrete. The absence of timely maintenance also plays a considerable role in the failure of concrete structures. Therefore, surveillance, evaluation, and assessment of the "health" of concrete structures at an early stage to alleviate deterioration or avoid sudden accidents are of great importance to the extension of the service life and the security of lives and property. As is known in the art, a process of monitoring changes that occur within concrete structures and providing real-time information of structural conditions for safety assessment and afterward maintenance planning is known as structural health monitoring (SHM).

Usually, an entire SHM system is a self-monitoring system that includes some type of sensory system. The SHM system enables data acquisition, transmission, and management. For purposes of example, one type of sensing technology, sensing concrete, has the capability to sense its condition and environmental changes. Sensing concrete, also known as intrinsic self-sensing, self-monitoring, or self-diagnosing concrete, can be fabricated through incorporating some functional fillers such as carbon fibers (CFs), carbon nanotubes (CNTs), graphene, and nickel powder into conventional concrete. The functional fillers with intrinsic sensing properties usually are electrically conductive in nature. Well distributed functional fillers at a critical concrete composite, making the composite conductive. Changes in the composite caused by external forces or environmental actions disturb the conductive network, leading to changes in the composite's electrical properties (usually electrical resistance). With this principle, stress (or force), strain (or deformation), crack, damage, temperature, and humidity under static and dynamic conditions can be detected.

In FIG. 7, the self-sensing concrete block 700 includes a kind of conductive network constituted by functional fillers acts as a "nervous system" to transduce signals 710 stimulated internally and externally to a computing center 750. Compared with other smarter sensors used in SHM, sensing concrete has inherent hostile compatibility and an identical lifespan due to its cement-based property when embedded inside concrete structures. In addition, with the functional filler reinforcement, sensing concrete exhibits remarkably enhanced mechanical properties and durability over the conventional concrete. The versatile, tunable, and easy-to-scale features of the fabrication process enable a great potential for mediating sensing concrete with controlled composition, dimension, configuration, and function to fulfill various engineering applications. Therefore, this smart material can be employed to produce intelligent infrastructure integrated with sensing and health monitoring abilities, thus improving serviceability, safety, reliability, and durability of the infrastructures. On the basis of whether one or multiple sensing elements being integrated, the sensing concrete can be classified into non-intrinsic self-sensing concrete and intrinsic self-sensing concrete. For the non-intrinsic self-sensing concrete, as the name implies, external sensors or actuators such as strain gauges, optical fiber sensors, piezoelectric ceramics, electrochemical sensors, shape memory alloys, and conductive polymer composites are embedded, Thus, sensing concrete can be used to monitor the abnormal change of stress/strain in the damaged parts of structures. Usually, it can be used in bulk, coating, sandwich, bonded, and embedded forms. When the components such as beam, column, plate, ring, and brick are wholly made of sensing concrete, this is called the bulk form. The coating form refers to that one surface of a component is covered with a layer of sensing concrete, and the sandwich form means that the top and bottom surfaces of a component are both covered with sensing concrete layers. In addition, sensing concrete can be prefabricated into sensors with size as conventional coarse aggregate. Then, the small sensors can be attached to the concrete component using glue, and this is called the bonded form. The embedded form means that the prefabricated sensors are embedded into concrete components to monitor the stress/strain change of damaged parts.

In different embodiments, insured members may insure properties that make use of or otherwise incorporate these types of self-sensing materials. The member can authorize and enable the transmission of data collected by the embedded sensors to the claim management system. In terms of the systems and methods described herein, in different embodiments, signals from such materials can be acquired, processed, and used to actuate or execute various events, such as claim payouts, as described herein.

In other examples, chemical or mechanical degradation processes could be detected by incorporating into the cement a sensor whose transducer is sensitive to both stress and changes in chemical environment. In some embodiments, sensors can be embedded into the building's structure that can provide information on stress changes, shearing or even of fracturing in the walls of the house. In some embodiments, building materials can include other well dispersed conductive fillers such as e.g., metal fibers, graphite powder, carbon nanofibers, and carbon nanotubes that can show stress/strain and mechanical damage sensitivity.

As a non-limiting example, one or more piezoresistive sensors can be embedded into cement used to build a structure. Piezoresistivity is a physical property of materials defined as the change of the electrical resistivity upon exposure to stress. When a stress is applied to the material with embedded electrically conductive fillers, the interparticle distance in the filler decreases, and new conductive paths are created. The closer the conductive particles are, the more interparticle connections are created, thus the resistivity of the material decreases. The response of the material to stress takes place only above a critical concentration of conductive particles called percolation threshold. Above certain strain the observed resistivity changes become irreversible upon unloading and this effect is utilized to damage detection and localization of said damage.

Figure 8:
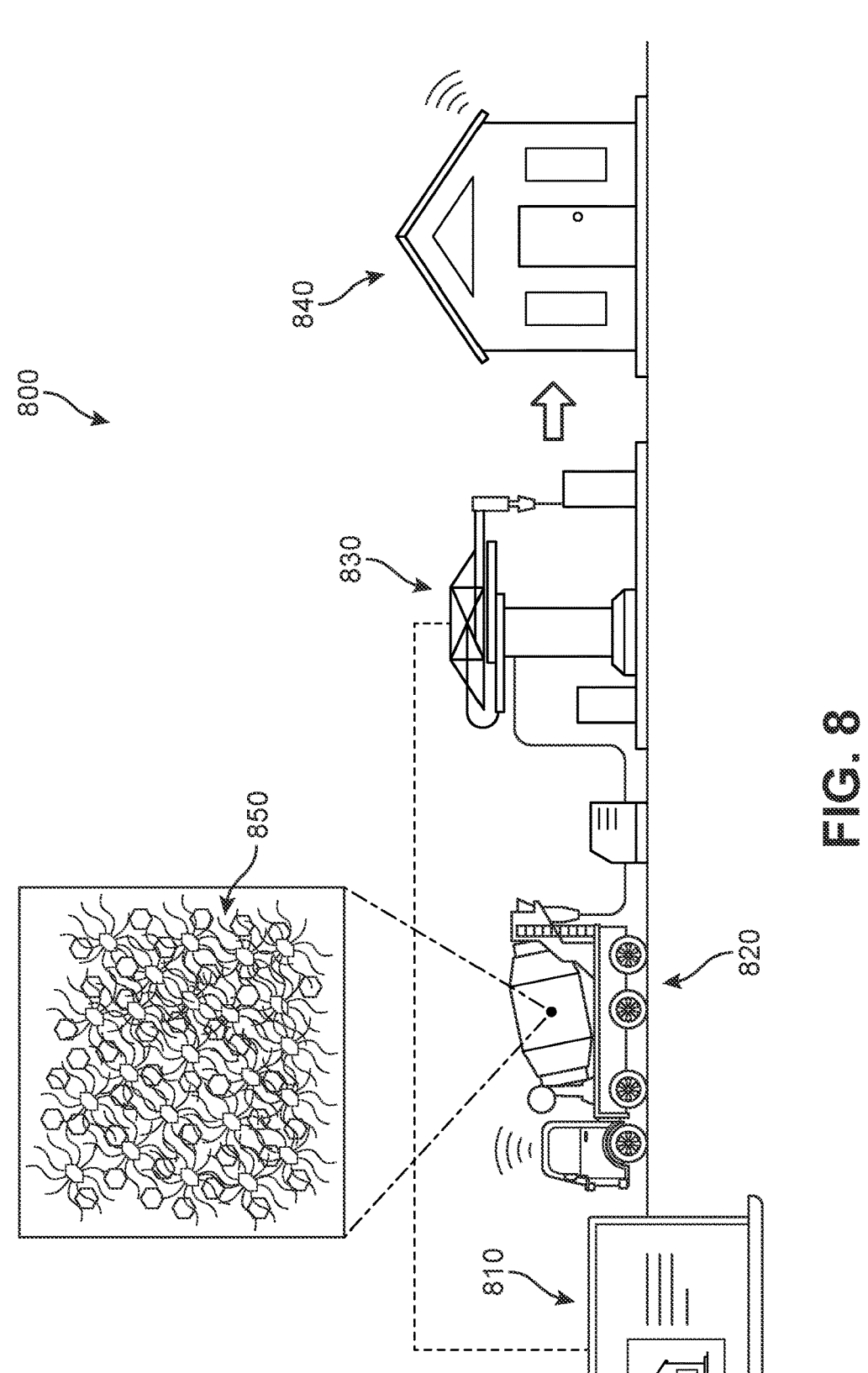
FIG. 8 depicts a process of building a 3DP house in which sensors have been embedded, according to an embodiment.

In another example, sensors can be embedded into one or more portions of a building by integration during 3DP-based construction. In some embodiments, such construction allows for a building with integrated electronic devices, including sensors and IoT devices that connect to a central network or the internet. These sensors can in some cases be controlled and monitored via a computer network. With additive manufacturing, IoT modules can be pre-installed during the printing stage of the building and the network can be set up early on. One depiction of a 3DP process 800 is shown in FIG. 8. A computer-aided design model of the building 810 is initially designed, which will incorporate specially sized and dimensioned accommodations, such as ridges and spaces, for IoT devices to be installed on the inside of the structure. In this scenario, electronics can then be integrated by robots and/or humans as 3D printing begins.

A diverse range of materials can be 3D printed as a result of fast development in additive manufacturing (AM) technologies. Materials in the forms of filaments, wire, powder, paste, sheets, and inks can be used for 3D printing. Polymers are one of the most common 3D print materials that have been developed for aerospace, automotive, sports, medical, architectural and toy industries. Polymers used in 3D printing are mainly in the form of filaments in FDM (the most common method), powders or auxiliary binder in the powder-bed method or resins in stereolithography. Thermoplastic polymers such as acrylonitrile-butadiene-styrene copolymers (ABS), polyamide (PA), polycarbonate (PC) and polylactic acid (PLA), and thermosetting powders such as polystyrene, polyamides and photopolymer resins, are the most common types of polymers for 3D printing. In addition, the reinforcement of polymers with fibers and nano-materials has been introduced in recent years with the aim of enhancing the mechanical properties of the printed products to be used as load-bearing or functional components. Manufacturers are taking advantage of 3D printing of metals and alloys in the manufacturing of complicated parts of various sizes. Metals are mainly in the form of powders (or wires). SLS, SLM and DED are the main methods of 3D printing which are all based on the fusion of powders by melting or sintering using a laser or electron beam.

In addition, 3D printed ceramics allow for components with a high strength to weight ratio and facilitated the creation of complex ceramic lattices for many applications. Ceramics are mainly 3D printed in the form of powders or ink. Powders are sintered using laser or bond together via an auxiliary adhesive. On the other hand, ink-jet printing is used to print a suspension of ceramic particles followed by post-treatment e.g., high-temperature sintering.

Concrete is the most used man-made material, which is consumed in construction and infrastructure projects around the world. Extrusion is the main method used for the additive manufacturing of concrete, although the powder-bed method is also used. The type of concrete suitable for 3D printing can be very different. As an example, pumpable concrete may not have enough shape-stability and dimensional accuracy after printing, even though it is good for the extrusion process of 3D printing. Self-compacting concrete may not be suitable for 3D printing as it may not hold its shape in the formwork-free method of 3D printing. The type of mixture used can significantly affect the resulting layer-by-layer appearance of the structure.

In some other embodiments, the 3DP material used can comprise a composite material 850 that is extruded from a source 820 and used to build a self-monitoring home 840 using additive manufacturing techniques 830. For example, the materials described above that incorporate embedded sensors and associated fillers can also be modified for use in 3DP scenarios.

As a general matter, 3DP concretes are a special type of concrete, which can be deposited through a 3D printer layer by layer without any formwork support and vibration process. Its important performance indexes, including workability, setting and hardening time, and mechanical properties, can be optimized by materials selection and printing parameters. To date, many building structures have been successfully printed using 3D printed concrete technology.

Current 3D printing technologies can tailor the multifunctional properties of the manufactured parts by combining different materials and controlling their position precisely. Some 3DP manufacturers and builders are able to vary materials between layers, which can be used during the process of embedding sensors into the structure, while others can change the materials also within a layer, allowing for complete integration of the embedded sensor(s) in the mixture. For instance, high-pressure jetting systems can combine only polymers with good flowability and similar curing temperatures and extrusion-based methods, such as FDM, can couple only materials with similar melting temperatures. Other 3D printing technologies, such as DED, allow for the combination of metal alloys or ceramics, and as a result, more materials can be extruded at the same time.

In general, the majority of 3D printed housing projects use concrete-like materials, but that are not necessarily concrete. Traditional concrete is unsuitable for 3D printing, as it would clog the printer nozzle and not adhere properly to the previous layers; thus, proprietary concretes are created to avoid these issues. 3DP manufacturers use a mixture of cement, sand (or crushed stone or gravel), fibers, and occasionally other materials. Furthermore, many parties in the 3DP industry have developed proprietary concrete mixtures and provide them with closed-use compatibility to their machines. Instead of Portland cement, these companies will include one or more special additives that are not necessarily specified, but that make the mixes functional. These proprietary concretes are typically associated with different guarantees with respect to the structure's long-term durability, as well as make the concrete much easier to 3D print with the standard extruder model, whether using a gantry or stand-alone machine. Some non-limiting examples of proprietary concrete blends that may be identified by the systems described herein include (a) Apis Cor®'s mixture reportedly using concrete, gypsum, and proprietary materials developed by the company, a mixture that is limited for sale for use with their own printer and company; (b) Icon®'s proprietary cementitious-based material, 'Lavacrete', as well as 3DP insulation, and steel; (c) Winsun®'s proprietary Special Reinforced Concrete; (d) SQ4D®'s SQ4D® concrete; (e) and DFab®'s concrete mix specifically formulated for 3D printing construction that includes an additive ingredient referred to as COBOD®'s Magic Mix to make the DFab® mix work properly. Other printed materials that may be detected include proprietary mortars, proprietary plastics, proprietary muds, proprietary sands, proprietary waste mixes, proprietary metals, proprietary woods, proprietary crushed stones, as well as proprietary dry mixes that can be used to print various new materials such as Black Buffalo®'s clay, wood, hemp, oyster shells, and colored clays.

Figure 9:
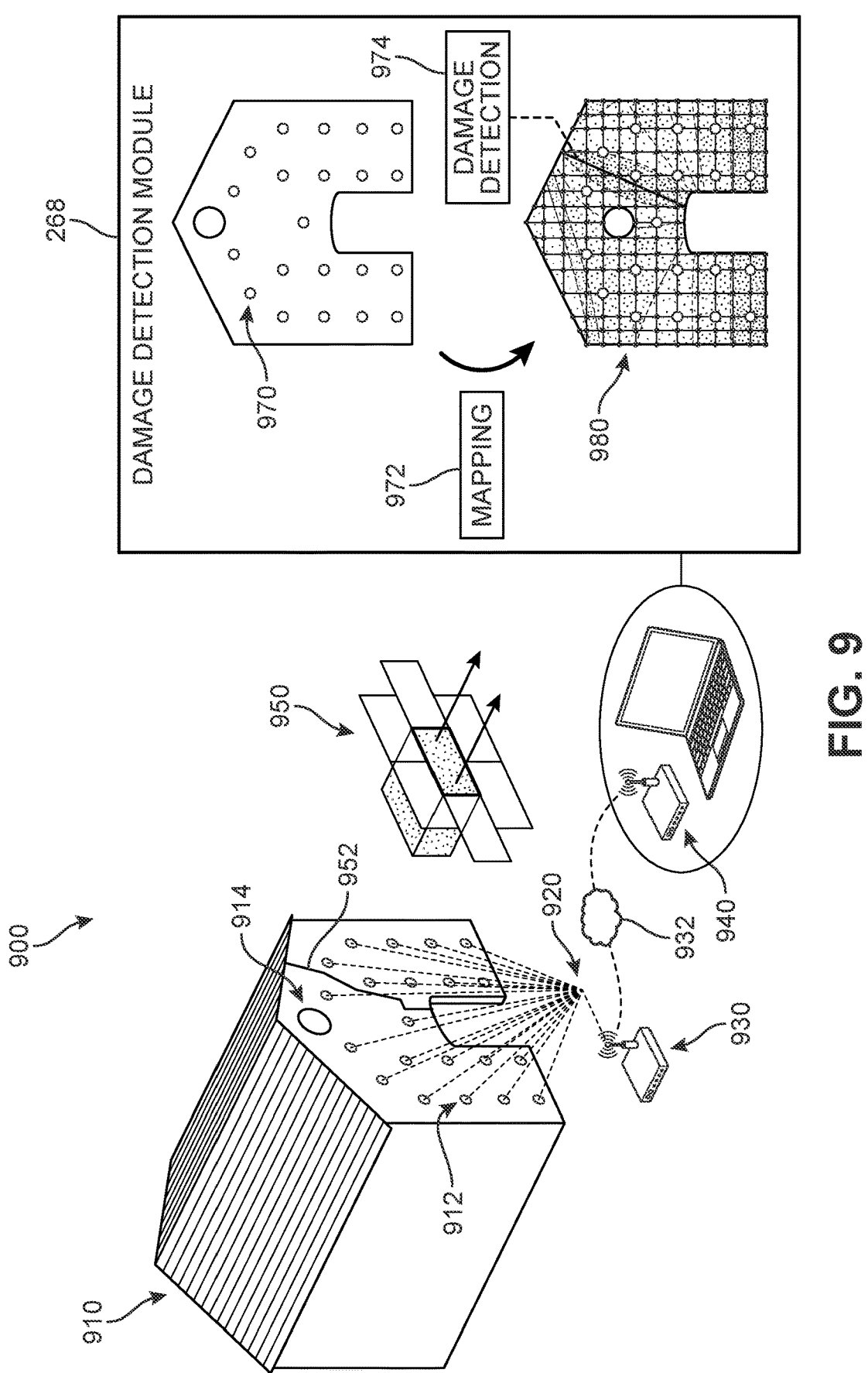
FIG. 9 is a schematic illustration of a data acquisition and damage detection process, according to an embodiment.

A non-limiting example of a self-monitoring structure in which sensors have been embedded during construction (whether by masonry or by 3DP) is presented in FIG. 9. In this example, the outer wall of a house 910 can be understood to include embedded piezoresistive sensors 912 that exhibit self-sensing capabilities through measurable changes in their electrical resistance when subjected to external loads. This arrangement allows the house 910 to behave like a self-diagnostic structure with high-fidelity information on its strain condition. In FIG. 9, a plurality of the embedded piezoresistive sensors 912 have been deployed within the material comprising the walls of the house 910. In some embodiments, these portions can be deployed into the sections of interest, such as facades or key locations with load concentrations at connections, lintels, or openings. When the sensors are active, their output 920 is received by an onsite processor 930 for a computer terminal to perform data acquisition and on-site data processing. The data is then transmitted over a network 932 to a remote server 940 (e.g., associated with the clam management systems described herein) for postprocessing.

An example of the data processing performed by the damage detection module 268 is shown in FIG. 9, schematically depicting the house as including a plurality of sensor monitoring points 970, which are then mapped and interpolated, as illustrated in strain map 980, whereby damages can be detected from load-path changes or anomalous strain concentrations or releases. For purposes of this example, data has been collected that corresponds to a crack 952 that has appeared in a side wall 914 of the house 910. This data is translated as damage detection 974 in the strain map 980. The outputted strain map 980 can be used to automatically generate a damage report that indicates damage, type of damage, extent of damage, and severity of said damage. This information can then be used by the claim management system to determine whether a payout should be made, and the amount of the payout. In cases where the data is ambiguous or the damage is not clear, the verification module can perform a follow up operation to collect further data. In some embodiments, payout can be contingent on a precursor event or antecedent having also been identified that can be understood to have caused said damage. For example, in FIG. 9, an earthquake occurred in the 24-hour period prior to the crack 952 being detected. The accompaniment of the damage with the natural disaster allows the claim management system to automatically approve and payout the claim, as the member's insurance policy is intended to cover damage caused by natural disasters. In other examples, the individual insurance policy terms and conditions will dictate how and in what circumstances a payment would be made.

Figure 10:
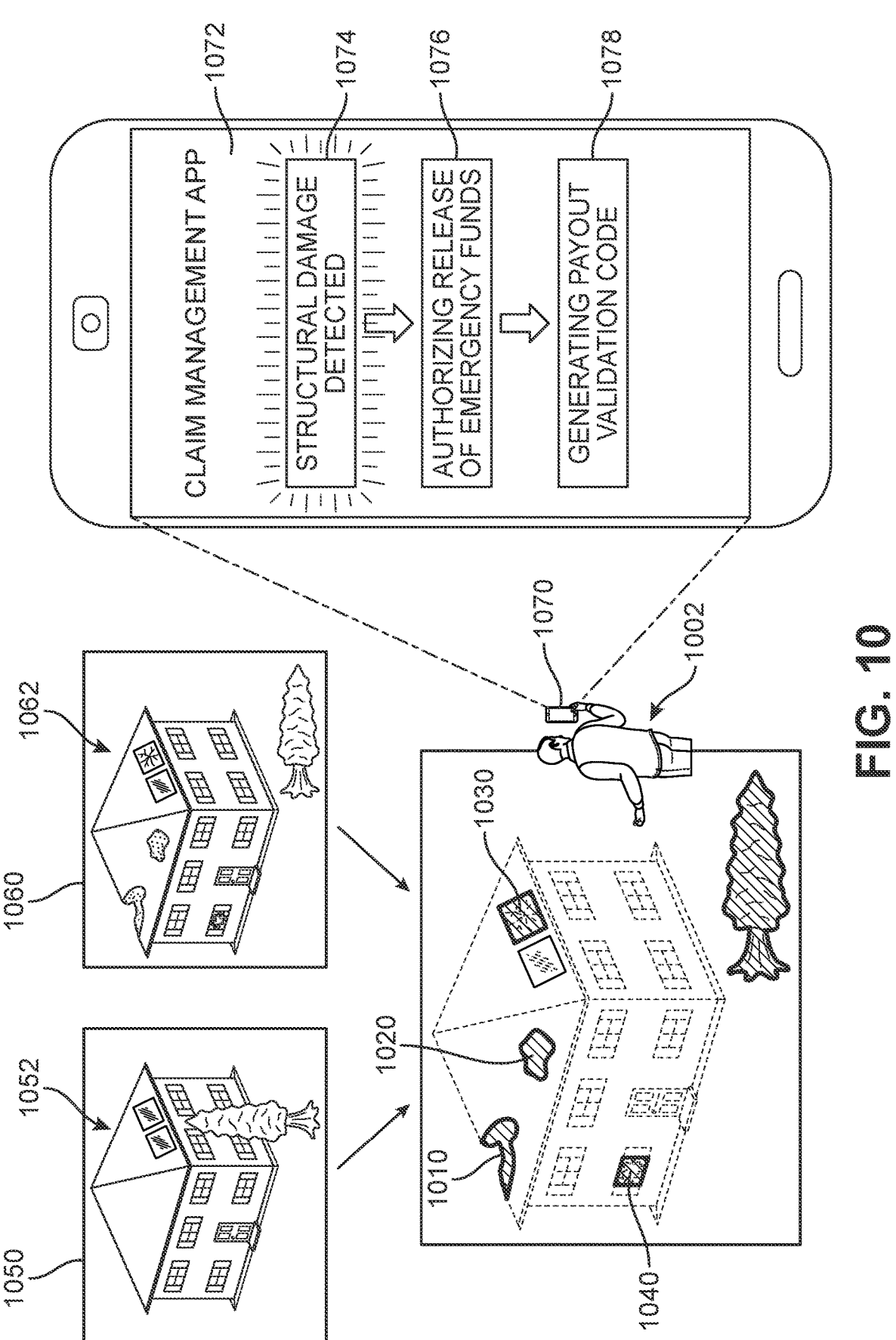
FIG. 10 illustrates an example of a disaster causing damage to a home and the claim management system automatically triggering a release of funds in response to the detected damage, according to an embodiment.

One illustration of the proposed system is presented in FIG. 10, where a resident 1002—also a policy holder of an insurance for their home 1052—is shown outside their residence following a storm. For purposes of clarity to the reader, the home 1052 is shown in its earlier, undamaged condition 1050, and a subsequent, damaged condition 1060 in which several areas of the home can be seen to include damaged portions 1062. The embedded sensors in the home 1052 have collected data and the damage detection module identifies multiple points of damage, as represented by a first damaged portion 1010 (along the roof), a second damaged portion 1020 (also along the roof), a third damaged portion 1030 (a skylight), and a fourth damaged portion (a window). This damage data is shared with the claims processor which triggers a payout. This process is illustrated in claim management app ("app") 1072 accessed via a mobile device 1070 by the resident 1002. The app 1072 presents a first alert 1074 to the resident 1002 that structural damage has been detected, followed by a second alert 1076 that the system has authorized a release of emergency funds to the resident 1002 in response to the detection of damage. A third alert 1078 confirms that the payout has been processed, and is being delivered to the resident 1002.

In some embodiments, payout can occur via generation of a payout validation code that can be used by the resident 1002 to obtain funds from a financial institution and/or local merchants. For example, the payout validation code can refer to a cryptographic element (code) including the amount of virtual currency that the insurance company (via the smart contract) is releasing as payout. The resident 1002 obtains the cryptographic element which allows them to receive the virtual currency. The recipient can then view their funds in a virtual wallet. In one embodiment, the cryptographic element is a QR code. In another embodiment, the virtual currency can also be transmitted through infrared, sonic wave, or WIFI AD-HOC. It is noted that the transmission of the virtual currency can be completely an offline transmission. In some embodiments, the cryptographic element comprises a private key, which in the context of Bitcoin is a secret number that allows the Bitcoins to be spent. Every Bitcoin address has a matching private key, which is saved in the virtual wallet file of the person who owns the balance. The private key is mathematically related to the Bitcoin address, and is designed so that the Bitcoin address can be calculated from the private key, but importantly, the same cannot be done in reverse. In other words, the private key is the "ticket" that allows someone to obtain and spend Bitcoins. Thus, in some embodiments, the virtual ticket, obtained while offline, authorizes the resident 1002 to spend the Bitcoins. In some embodiments, the insured member can use the payout to make purchases even while remaining offline. For example, the user device can be configured to create a cryptographically signed digital check to the desired merchant's terminal using a short-range link (SRL), such as a peer-to-peer radio or other links through which the user device can communicate with another device.

In some embodiments, the proposed systems are further configured to collect information from the insured to determine if further review, and a subsequent adjuster examination of the damage, is necessary. The system may collect basic information from the insured can be transmitted as documents for claims and associated the document with appropriate claim files to a (remote) central claim processing system. The documents stored in the loss data/module may be videos, photos, voice recordings, faxes and any of number of other reproducible media related to an insurance claim.

FIG. 11 is a flow chart illustrating an embodiment of a method 1100 of releasing funds in response to property damage and facilitating claims processing transactions. The method 1100 includes a first step 1110 of receiving, at a claim management system and from a first sensor device embedded in a structure, first data, and a second step 1120 of determining, at the claim management system and based on the first data, there is a high likelihood of a first portion of the structure being associated with damage. In addition, a third step 1130 includes classifying, at the claim management system and based on the first data, the damage as corresponding to a first damage type, and a fourth step 1140 includes determining, at the claim management system, the classification satisfies a required first condition for an insurance policy associated with the structure. The method 1100 also includes a fifth step 1150 of generating, from the claim management system and in response to the first condition being satisfied, an authorization signal to a claims processor, the authorization signal triggering a payout of a first fund to a first person associated with the insurance policy.

In other embodiments, the method may include additional steps or aspects. In some embodiments, the method also includes determining a disaster event covered by the insurance policy occurred within a first timeframe before the first data was obtained. For purposes of this disclosure, the first timeframe refers to an event that has occurred within a predefined period of time preceding the detection of damage. The timeframe can be selected and adjusted based on the type of damage and the disaster (e.g., earthquakes can cause structural damage that do not become evident for 3-4 weeks, while flood damage is usually immediately during and following a storm).

In another example, the method also includes determining the classification satisfies a required second condition for a smart contract previously established on behalf of the first person, wherein the payout is provided via a distributed ledger system in which a predefined blockchain-based asset is managed. In some embodiments, the method includes assigning a severity level to the damage based on the first data, wherein the payout is relatively larger in cases in which the severity level is above a pre-established threshold, and relatively smaller in cases in which the severity level is below the pre-established threshold. In one embodiment, the method includes classifying the damage as one of a total loss and a partial loss, wherein the payout is relatively larger in cases in which the damage is classified as a total loss, and relatively smaller in cases in which the damage is classified as a partial loss.

In different embodiments, the disaster event is one of a hurricane, tornado, flood, drought, volcanic eruption, earthquake, storm, wildfire, terrorist attack, and act of war. In one example, an amount of the payout is based on characteristics of the first portion (e.g., a roof, floor, wall, window, door, etc.). In another embodiment, the method includes steps of receiving first image data of the first portion of the structure, the first image data having been captured after the damage was recorded by the first sensor device, determining the first image data is consistent with the first data, and verifying the damage. In some examples, the first sensor device is one of a strain gauge sensor, capacitive sensor, magnetic sensor, piezoelectric sensor, and electrochemical sensor.

Other methods can also be contemplated within the scope of this disclosure. For example, a method of verifying damage to a property is disclosed. The method includes a first step of receiving, at a claim management system and from a first sensor device embedded in a structure, first data, and a second step of determining, at the computing device and based on the first data, there is a likelihood of a first portion of the structure being associated with damage. The method also includes a third step of requesting, by the claim management system, second data associated with the first portion, the second data being captured by an onboard sensor of an aerial drone, and a fourth step of determining, at a verification module of the claim management system, that the second data is consistent with the first data. The method also includes a fifth step of generating, at the claim management system and in response to the second data being consistent with the first data, an authorization signal to a claims processor, the authorization signal triggering a payout of a first fund to a first person associated with the structure.

In other embodiments, the method may include additional steps or aspects. In one example, the method also includes deploying, from a drone repository, the aerial drone at a time after the first data was obtained in response to receiving the request for the second data. In some embodiments, the first sensor device is one of a strain gauge sensor, capacitive sensor, magnetic sensor, piezoelectric sensor, and electrochemical sensor. In another example, the onboard sensor is one of an image sensor, moisture sensor, infrared sensor, and temperature sensor.

In the figures depicted, different examples of a user interface ("interface") are presented on a touchscreen display of a mobile device, offering content via native controls included in the interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments (not shown in the drawings), the interface can include a welcome or header message(s), and/or a plurality of data input fields can also be presented. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present embodiments may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments have been described, the description is intended to be exemplary, rather than limiting, and it will be apparent to those of ordinary skill in the art that many more embodiments and implementations are possible that are within the scope of the embodiments. Accordingly, the disclosed embodiments are not to be restricted except in light of the attached claims and their equivalents. Also, various modifications and changes may be made within the scope of the attached claims.

We claim:

1. A computer-implemented method of releasing funds in response to property damage, the method comprising:
   receiving first data at a claim management system and from a plurality of sensor monitoring devices including a first sensor device, a second sensor device, and a third sensor device, each sensor monitoring device being embedded in a portion of one or more of a flooring, roofing, wall, window, door, and foundation of a structure, wherein each sensor monitoring device is configured to monitor abnormal changes in stress or strain in the portion in which it is embedded;
   classifying, at a damage detection machine learning (ML) model of the claim management system, the first data as corresponding to a first damage type that includes one or more of:
      a chemical or mechanical degradation process as detected by a first sensor device, the first sensor device comprising a transducer that is sensitive to stress and chemical changes in its environment, mechanical damage or strain detected by a second sensor device, the second sensor device comprising one or more of metal fibers, graphite powder, carbon nanofibers, and carbon nanotubes that serve as conductive fillers, and a change in electrical resistivity detected by a third sensor device, the third sensor device comprising a piezoresistive sensor;

determining, at the claim management system, the classification satisfies a required first condition for an insurance policy associated with the structure; and generating, from the claim management system and in response to the first condition being satisfied, an authorization signal to a claims processor, the authorization signal triggering a payout of a first fund to a first person associated with the insurance policy.

2. The method of claim 1, further comprising determining a disaster event covered by the insurance policy occurred within a first timeframe before the first data was obtained.

3. The method of claim 1, further comprising determining the classification satisfies a required second condition for a smart contract previously established on behalf of the first person, wherein the payout is provided via a distributed ledger system in which a predefined blockchain-based asset is managed.

4. The method of claim 1, further comprising assigning a severity level to the damage based on the first data, wherein the payout is relatively larger in cases in which the severity level is above a pre-established threshold, and relatively smaller in cases in which the severity level is below the pre-established threshold.

5. The method of claim 1, further comprising classifying the damage as one of a total loss and a partial loss, wherein the payout is relatively larger in cases in which the damage is classified as a total loss, and relatively smaller in cases in which the damage is classified as a partial loss.

6. The method of claim 1, wherein the disaster event is one of a hurricane, tornado, flood, drought, volcanic eruption, earthquake, storm, wildfire, terrorist attack, and act of war.

7. The method of claim 1, wherein an amount of the payout is based on characteristics of the first portion.

8. The method of claim 1, further comprising:

receiving first image data of the first portion of the structure, the first image data having been captured after the damage was recorded by the first sensor device;

determining the first image data is consistent with the first data; and verifying the damage.

9. The method of claim 1, further comprising mapping and interpolating the first data to generate a strain map of the structure.

10. A computer-implemented method of verifying damage to a property, the method comprising:

receiving first data at a claim management system and from a plurality of sensor monitoring devices including a first sensor device, a second sensor device, and a third sensor device, each sensor monitoring device being embedded in a portion of one or more of a flooring, roofing, wall, window, door, and foundation of a structure, wherein each sensor monitoring device is configured to monitor abnormal changes in stress or strain in the portion in which it is embedded;

classifying, at a damage detection machine learning (ML) model of the claim management system, the first data, as corresponding to a first damage type that includes one or more of:

a chemical or mechanical degradation process as detected by a first sensor device, the first sensor device comprising a transducer that is sensitive to stress and chemical changes in its environment, mechanical damage or strain detected by a second sensor device, the second sensor device comprising one or more of metal fibers, graphite powder, carbon nanofibers, and carbon nanotubes that serve as conductive fillers, and a change in electrical resistivity detected by a third sensor device, the third sensor device comprising a piezoresistive sensor;

requesting, by the claim management system, second data associated with the first portion, the second data being captured by an onboard sensor of an aerial drone;

determining, at a verification module of the claim management system, that the second data is consistent with the first data; and generating, at the claim management system and in response to the second data being consistent with the first data, an authorization signal to a claims processor, the authorization signal triggering a payout of a first fund to a first person associated with the structure.

11. The method of claim 10, further comprising deploying, from a drone repository, the aerial drone at a time after the first data was obtained in response to receiving the request for the second data.

12. The method of claim 10, further comprising assigning a severity level to the damage based on the first data, wherein the payout is relatively larger in cases in which the severity level is above a pre-established threshold, and relatively smaller in cases in which the severity level is below the pre-established threshold.

13. The method of claim 10, wherein the onboard sensor is one of an image sensor, moisture sensor, infrared sensor, and temperature sensor.

14. A system for releasing funds in response to property damage, the system comprising a processor and machine-readable media including instructions which, when executed by the processor, cause the processor to:

receive first data at a claim management system and from a plurality of sensor monitoring devices including a first sensor device, a second sensor device, and a third sensor device, each sensor monitoring device being embedded in a portion of one or more of a flooring, roofing, wall, window, door, and foundation of a structure, first data wherein each sensor monitoring device is configured to monitor abnormal changes in stress or strain in the portion in which it is embedded;

classify, at a damage detection machine learning (ML) model of the claim management system, the first data as corresponding to a first damage type that includes one or more of:

a chemical or mechanical degradation process as detected by a first sensor device, the first sensor device comprising a transducer that is sensitive to stress and chemical changes in its environment, mechanical damage or strain detected by a second sensor device, the second sensor device comprising one or more of metal fibers, graphite powder, carbon nanofibers, and carbon nanotubes that serve as conductive fillers, and a change in electrical resistivity detected by a third sensor device, the third sensor device comprising a piezoresistive sensor;

determine, at the claim management system, the classification satisfies a required first condition for an insurance policy associated with the structure; and generate, from the claim management system and in response to the first condition being satisfied, an authorization signal to a claims processor, the authorization signal triggering a payout of a first fund to a first person associated with the insurance policy.

15. The system of claim 14, wherein the instructions further cause the processor to determine a disaster event covered by the insurance policy occurred within a first timeframe before the first data was obtained.

16. The system of claim 14, wherein the instructions further cause the processor to determine the classification satisfies a required second condition for a smart contract previously established on behalf of the first person, and the payout is provided via a distributed ledger system in which a predefined blockchain-based asset is managed.

17. The system of claim 14, wherein the instructions further cause the processor to assign a severity level to the damage based on the first data, and the payout is relatively larger in cases in which the severity level is above a pre-established threshold, and relatively smaller in cases in which the severity level is below the pre-established threshold.

18. The system of claim 14, wherein the instructions further cause the processor to classify the damage as one of a total loss and a partial loss, and the payout is relatively larger in cases in which the damage is classified as a total loss, and relatively smaller in cases in which the damage is classified as a partial loss.

19. The system of claim 14, wherein the instructions further cause the processor to:

receive first image data of the first portion of the structure, the first image data having been captured after the damage was recorded by the first sensor device;

determine the first image data is consistent with the first data; and verify the damage.

20. The system of claim 14, wherein the instructions further cause the processor to map and interpolate the first data to generate a strain map of the structure.

* * * * *